US009747170B2

(12) United States Patent
Lee

(10) Patent No.: US 9,747,170 B2
(45) Date of Patent: Aug. 29, 2017

(54) NON-VOLATILE MULTI-LEVEL CELL MEMORY SYSTEM AND METHOD OF PERFORMING ADAPTIVE DATA BACK-UP IN THE SYSTEM

(71) Applicant: Samsung Electronics Co., Ltd., Suwon-Si, Gyeonggi-Do (KR)

(72) Inventor: Jae Il Lee, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 758 days.

(21) Appl. No.: 14/208,600

(22) Filed: Mar. 13, 2014

(65) Prior Publication Data

US 2014/0281174 A1    Sep. 18, 2014

(30) Foreign Application Priority Data

Mar. 15, 2013   (KR) .................. 10-2013-0028065

(51) Int. Cl.
*G06F 11/14* (2006.01)
*G06F 3/06* (2006.01)
*G06F 3/00* (2006.01)
*G06F 12/02* (2006.01)

(52) U.S. Cl.
CPC .......... *G06F 11/1458* (2013.01); *G06F 3/065* (2013.01); *G06F 3/0613* (2013.01); *G06F 3/0679* (2013.01); *G06F 12/0246* (2013.01); *G06F 2212/1016* (2013.01); *G06F 2212/7203* (2013.01); *G06F 2212/7208* (2013.01)

(58) Field of Classification Search
None
See application file for complete search history.

(56) References Cited

U.S. PATENT DOCUMENTS

| 7,035,144 B2 | 4/2006 | Kim et al. |
|---|---|---|
| 7,535,768 B2 | 5/2009 | Seong et al. |
| 7,594,157 B2 | 9/2009 | Choi et al. |
| 7,990,795 B2 | 8/2011 | Pelley, III et al. |
| 8,036,030 B2 | 10/2011 | Seong et al. |
| 8,054,685 B2 | 11/2011 | Lim |
| 8,090,918 B2 | 1/2012 | Fang et al. |
| 8,190,812 B2 | 5/2012 | Yano et al. |
| 2011/0199822 A1 | 8/2011 | Yoon et al. |
| 2012/0233417 A1* | 9/2012 | Kalach ................ G06F 11/1469 711/162 |

FOREIGN PATENT DOCUMENTS

| KR | 2007-0109686 A | 11/2007 |
|---|---|---|
| KR | 10-1041837 B1 | 6/2011 |
| KR | 2011-0065757 A | 6/2011 |

* cited by examiner

*Primary Examiner* — Chun-Kuan Lee
*Assistant Examiner* — Dayton Lewis-Taylor
(74) *Attorney, Agent, or Firm* — Harness, Dickey & Pierce, P.L.C.

(57) ABSTRACT

In one example embodiment of the inventive concepts, an adaptive data backup method performed in a memory system including a non-volatile multi-level cell memory device includes receiving a write command from a host and determining a backup data size which is a size of data to be backed up among data requested to be written in the write command. The adaptive data backup method further includes selecting a backup type among at least two different backup types, based on the backup data size and backing up the data according to the selected backup type.

15 Claims, 23 Drawing Sheets

NON-VOLATILE MULTI-LEVEL CELL MEMORY SYSTEM AND METHOD OF PERFORMING ADAPTIVE DATA BACK-UP IN THE SYSTEM

CROSS-REFERENCE TO RELATED APPLICATIONS

This application claims the benefit of Korean Patent Application No. 10-2013-0028065, filed on Mar. 15, 2013, in the Korean Intellectual Property Office, the disclosure of which is incorporated herein in its entirety by reference.

BACKGROUND

The inventive concepts relate to non-volatile memory devices, and more particularly, to a non-volatile multi-level cell (MLC) memory device, a system including the same, and a method of performing an adaptive page back-up in the system.

One of various causes that degrade the performance of a write operation of the MLC NAND flash memory is a backup operation performed on a paired page (or a least significant bit (LSB) page).

A backup method performed on a paired page may be largely classified into a post-backup method and a pre-backup method according to a point of time that a backup is performed. Recently, the post-backup method has been widely used.

An example of a conventional backup performed on a paired page has been disclosed in Korean Patent Publication No. 10-2010-0033855. An LSB page is backed up using the post-backup method while a most significant bit (MSB) page is performed. Thus, the LSB page is backed up by reading the LSB page and writing the read LSB page to a backup block. However, this method is inefficient since a backup time is long. That is, a write overhead occurs due to a backup of data.

SUMMARY

The inventive concepts provide an adaptive data backup method capable of reducing degradation of the performance of a write operation in a memory system including a non-volatile multi-level cell (MLC) memory device, caused by a backup of data, and a system capable of performing the adaptive data backup method.

In one example embodiment of the inventive concepts, an adaptive data backup method performed in a memory system including a non-volatile multi-level cell memory device includes receiving a write command from a host and determining a backup data size which is a size of data to be backed up among data requested to be written in the write command. The adaptive data backup method further includes selecting a backup type among at least two different backup types, based on the backup data size and backing up the data according to the selected backup type.

In yet another example embodiment, the selecting selects a first backup type if the backup data size is less than or equal to a first threshold.

In yet another example embodiment, if the backup data size is greater than the first threshold, the selecting includes checking a number of times of backing up data pages and selecting one of a second backup type and a third backup type based on the number of times of backing up data pages.
In yet another example embodiment, the first threshold corresponds to N/2 channels, the N channels connecting the non-volatile multi-level memory device to a controller with N being a natural number that is equal to or greater than 2 and a plurality of memory devices are connected to each of the N channels, wherein the number of the plurality of memory devices is equal to or greater than 2.

In yet another example embodiment, the selecting one of the second backup type and the third backup type includes selecting the second backup type when the number of times of backing up data pages is less than or equal to a second threshold and selecting the third backup type when the number of times of backing up data pages is greater than the second threshold.

In yet another example embodiment, if the first backup type is selected, the backing up the data includes simultaneously and commonly applying a page program setup command to a first channel and a second channel, simultaneously applying a first channel address and a second channel address to the first channel and the second channel, respectively, simultaneously transmitting least significant bit (LSB) data requested to be written to the first channel and the second channel and simultaneously and commonly applying a page program confirm command to the first channel and the second channel wherein the first channel address is an address for designating a page of a data block to which the LSB data is to be written by a first memory device connected to the first channel and the second channel address is an address for designating a page of a backup block to which the LSB data is to be backed up by a second memory device connected to the second channel.

In yet another example embodiment, the backing up the data further includes storing the LSB data transmitted via the first channel in a page buffer of the first memory device and storing the LSB data transmitted via the second channel in a page buffer of the second memory device. The backing up the data further includes programming the LSB data stored in the page buffer of the first memory device to a page of the data block corresponding to the first channel address by the first memory device according to the page program confirm command and programming the LSB data stored in the page buffer of the second memory device to a page of the backup block corresponding to the second channel address by the second memory device according to the page program confirm command wherein the programming of the LSB data to the page of the data block and the programming of the LSB data to the page of the backup block are performed in parallel.

In yet another example embodiment, if the second backup type is selected, the backing up the data includes simultaneously and commonly applying a page program setup command to a first channel and a second channel, the first channel and the second channel connecting the non-volatile multi-level memory device to a NAND flash controller and simultaneously applying a first channel address and a second channel address to the first channel and the second channel, respectively, wherein the first channel address is an address for designating a page of a data block to which first least significant bit (LSB) data is to be written by a first memory device connected to the first channel, and the second channel address is an address for designating a page of a data block to which second LSB data is to be written by a second memory device connected to the second channel, the first memory device and the second memory device being connected to the first channel and the second channel, respectively. The backing up the data further includes simultaneously transmitting the first LSB data which is a part of LSB data requested to be written and the second LSB data which is another part of the LSB data to the first channel and the second channel, respectively, simultaneously and commonly applying a page program confirm command to the first channel and the second channel, commonly applying a state check command to the first channel and the second channel, checking whether the programming of the first LSB data by the first memory device and the programming of the second LSB data by the second memory device are completed according to the state check command, and commonly applying a copy-back program command to the first and second channels, simultaneously applying a third channel address and a fourth channel address to the first channel and the second channel, respectively, wherein the third channel address is an address for designating a page of a backup block to which the first LSB data is to be backed up by the first memory device, and the fourth channel address is an address for designating a page of a backup block to which the second LSB data is to be backed up by the second memory device and simultaneously applying a copy-back program confirm command to the first channel and the second channel. In yet another example embodiment, the backing up the data further includes storing the first LSB data transmitted via the first channel to a page buffer of the first memory device, storing the second LSB data transmitted via the second channel to a page buffer of the second memory device, programming the first LSB data stored in the page buffer of the first memory device to a page of a data block corresponding to the first channel address by the first memory device according to the page program confirm command and programming the second LSB data stored in the page buffer of the second memory device to a page of a data block corresponding to the second channel address by the second memory device according to the page program confirm command. The backing up the data further includes programming the first LSB data remaining in the page buffer of the first memory device to a page of a backup block corresponding to the third channel address by the first memory device according to the copy-back program confirm command and programming the second LSB data remaining in the page buffer of the second memory device to a page of a backup block corresponding to the fourth channel address by the second memory device according to the copy-back program confirm command wherein the programming the first LSB data stored in the page buffer of the first memory device and the programming the second LSB data stored in the page buffer of the second memory device are performed in parallel and the programming the first LSB data remaining in the page buffer of the first memory device and the programming the second LSB data remaining in the page buffer of the second memory device are performed in parallel.

In yet another example embodiment, if the third backup type is selected, the backing up the data further includes transmitting LSB data belonging to a first group via a first channel and a second channel, the first channel and the second channel connecting the non-volatile multi-level memory device to a NAND flash controller and programming the LSB data belonging to the first group to memory devices of the first channel and the second channel. The backing up further includes upon the programming of the LSB data belonging to the first group being completed, transmitting LSB data belonging to a second group via the first channel and the second channel, programming the LSB data belonging to the second group to the memory devices of the first channel and the second channel, generating parity data by performing a logical operation on the LSB data belonging to the first group and the LSB data belonging to the second group and backing up the parity data to the memory devices of the first and second channels.

In yet another example embodiment, before the generating of the parity data, the backing up the data according to the selected backup type further includes reading out the LSB data belonging to the first group to the page buffer wherein the parity data is generated by performing an XOR operation on the LSB data belonging to the first group and the LSB data belonging to the second group in the page buffer.

In one example embodiment, a memory system includes a memory controller and a non-volatile multi-level cell memory device including a plurality of memory devices connected to the memory controller via N channels, wherein N denotes a natural number that is equal to or greater than 2, wherein the memory controller is configured to receive a write command from a host, determines a backup data size, the backup data size being a size of data to be backed up among data requested to be written in the received write command, select a backup type among at least two different backup types, based on the backup data size and control the non-volatile memory device to back up the data according to the selected backup type.

In yet another example embodiment, the memory controller selects a first backup type when the backup data size is less than or equal to a first threshold, the first backup type being an interleaving pre-backup, and if the backup data size is greater than the first threshold, the memory controller checks a number of times of backing up data pages and selects one of a second backup type and a third backup type based on the checked number of times of backing up data pages the second backup type being a copy-back pre-backup and the third backup type being a parity page pre-backup, the first threshold is a page corresponds to N/2 channels.

In yet another example embodiment, if the memory controller selects the first backup type, the memory controller is configured to commonly apply least significant bit (LSB) data to a first channel and a second channel, commonly apply a program command to the first channel and the second channel and at least one memory device connected to the second channel programs the LSB data to a page of a backup block according to the program command while at least one memory device connected to the first channel programs the LSB data to a page of a data block according to the program command.

In yet another example embodiment, if the memory controller selects the second backup type, the memory controller is configured to simultaneously apply first least significant bit (LSB) data and second LSB data in parallel to a first channel and a second channel, respectively and commonly apply a program command to the first channel and the second channel. The memory controller is further configured to at least one memory device connected to the second channel programs the second LSB data to a page of a data block according to the program command while at least one memory device connected to the first channel programs the first LSB data to a page of a data block according to the program command. The memory controller is further configured to, when the programming of the first LSB data and the second LSB data is completed, the memory controller commonly applies a copy-back program command to the first channel and the second channel and the at least one memory device connected to the second channel backs up the second LSB data remaining in a page buffer thereof to a page of a backup block according to the copy-back program command while the at least one memory device connected to the first channel backs up the first LSB data remaining in a page buffer thereof to a page of a backup block according to the copy-back program command.

In yet another example embodiment, if the memory controller selects the third backup type, the memory controller is configured to transmit LSB data belonging to a first group via a first channel and a second channel to program the LSB data to memory devices of the first channel and the second channel, transmit LSB data belonging to a second group via the first channel and the second channel to program the LSB data belonging to the second group to the memory devices of the first channel and the second channel after the programming of the LSB data belonging to the first group is completed and back up data obtained by performing a logical operation on the LSB data belonging to the first group and the LSB data belonging to the second group to the memory devices of the first channel and the second channel after the programming of the LSB data belonging to the second group is completed.

In one example embodiment, a data backup method includes receiving a write command for writing data to a non-volatile memory device, determining a backup type from among a plurality of backup types based on a size of the data and backing up the data based on the determined backup type.

In yet another example embodiment, the determining the backup type includes selecting a first backup type if the size of the data is less than or equal to a first threshold, the first threshold corresponding to N/2 channels, the N channels connecting a memory controller to the non-volatile memory device, the non-volatile memory device having at least one memory device, each of the at least one memory device being connected to one of the N channels.

In yet another example embodiment, the determining determines one of a second backup type and a third backup type if the size of the data is greater than the first threshold.

In yet another example embodiment, if the size of the data is greater than the first threshold, the determining includes determining a number of times of backing up data pages and selecting one of a second backup type and a third backup type based on the determined number of times of backing up data pages.

In yet another example embodiment, the selecting selects the second backup type if the number of times is less than or equal to a second threshold and the selecting selects the third backup type if the number of times is greater than the second threshold.

In yet another example embodiment, wherein if the determining determines the first backup type, the backing up includes simultaneously and commonly applying a page program setup command to a first channel and a second channel, the first channel and the second channel connecting the non-volatile memory device to a memory controller in communication with the non-volatile memory device and simultaneously applying a first channel address and a second channel address to the first channel and the second channel, respectively, the first channel address being an address for designating a page of a data block to which least significant bit (LSB) data is to be written by a first memory device connected to the first channel, the second channel address being an address for designating a page of a backup block to which the LSB data is to be backed up by a second memory device connected to the second channel. The backing up further includes simultaneously transmitting the LSB data of the data to the first channel and the second channel and simultaneously and commonly applying a page program confirm command to the first channel and the second channel.

In yet another example embodiment, if the determining determines the second backup type, the backing up includes simultaneously and commonly applying a page program setup command to a first channel and a second channel, the first channel and the second channel connecting the non-volatile memory device to a memory controller in communication with the non-volatile memory device and simultaneously applying a first channel address and a second channel address to the first channel and the second channel, respectively, the first channel address being an address for designating a page of a data block to which first least significant bit (LSB) data is to be written by a first memory device connected to the first channel, the second channel address being an address for designating a page of a data block to which second LSB data is to be written by a second memory device connected to the second channel, the first memory device and the second memory device being connected to the first channel and the second channel, respectively. The backing up further includes simultaneously transmitting the first LSB data and the second LSB data to the first channel and the second channel, respectively, simultaneously and commonly applying a page program confirm command to the first channel and the second channel, commonly applying a state check command to the first channel and the second channel and checking whether the programming of the first LSB data and the programming of the second LSB data completed according to the state check command, and commonly applying a copy-back program command to the first and second channels. The backing up further includes simultaneously applying a third channel address and a fourth channel address to the first channel and the second channel, respectively, the third channel address being an address for designating a page of a backup block to which the first LSB data is to be backed up by the first memory device, the fourth channel address being an address for designating a page of a backup block to which the second LSB data is to be backed up by the second memory device and simultaneously applying a copy-back program confirm command to the first channel and the second channel.

In yet another example embodiment, the backing up further includes storing the transmitted first LSB data and transmitted second LSB data to a page buffer of the first memory device and a page buffer of the second memory device, respectively, programming the stored first LSB data to a page of a data block corresponding to the first channel address by the first memory device according to the page program confirm command and programming the stored second LSB data to a page of a data block corresponding to the second channel address by the second memory device according to the page program confirm command. The backing up further includes programming the first LSB data remaining in the page buffer of the first memory device to a page of a backup block corresponding to the third channel address by the first memory device according to the copy-back program confirm command and programming the second LSB data remaining in the page buffer of the second memory device to a page of a backup block corresponding to the fourth channel address by the second memory device according to the copy-back program confirm command, wherein the programming the first LSB data stored in the page buffer of the first memory device and the programming the second LSB data stored in the page buffer of the second memory device are performed in parallel and the programming the first LSB data remaining in the page buffer of the first memory device and the programming the second LSB data remaining in the page buffer of the second memory device are performed in parallel.

In yet another example embodiment, if the determining determines the third backup type, the backing up includes transmitting LSB data belonging to a first group via a first channel and a second channel, the first channel and the second channel connecting the non-volatile memory device to a memory controller in communication with the non-volatile memory device, programming the LSB data belonging to the first group to memory devices of the first channel and the second channel, upon the programming of the LSB data belonging to the first group being completed, transmitting LSB data belonging to a second group via the first channel and the second channel and programming the LSB data belonging to the second group to the memory devices of the first channel and the second channel. The backing up further includes generating parity data by performing a logical operation on the LSB data belonging to the first group and the LSB data belonging to the second group and backing up the parity data to the memory devices of the first and second channels.

In yet another example embodiment, prior to the generating parity data, the backing up of the data according to the selected backup type further comprises reading out the LSB data belonging to the first group to the page buffer and the parity data is generated by performing an XOR operation on the LSB data belonging to the first group and the LSB data belonging to the second group in the page buffer.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EXAMPLE EMBODIMENTS

Figure 1:
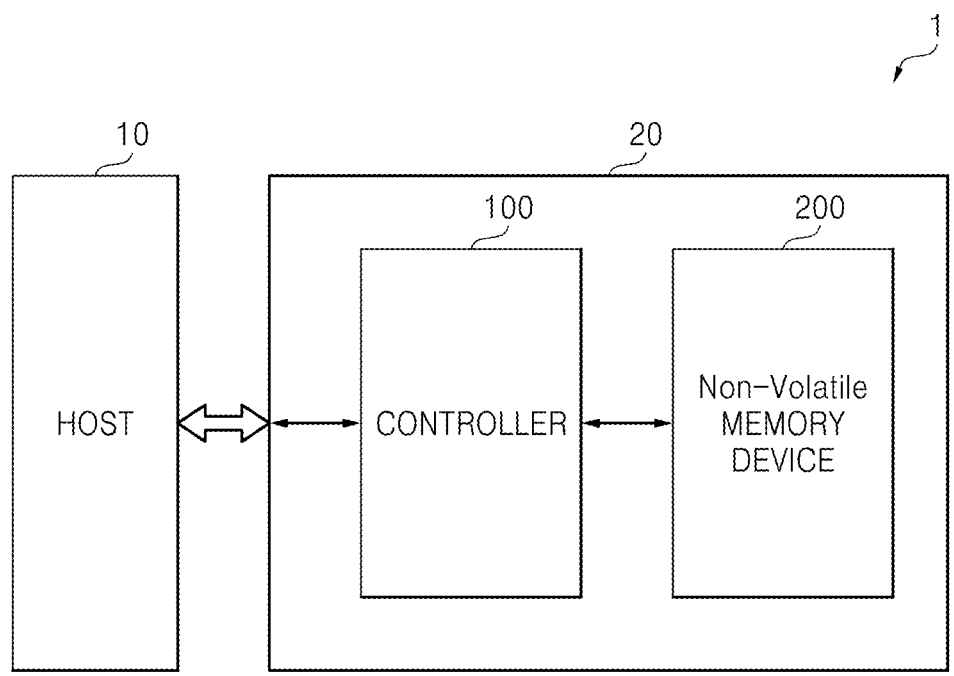
FIG. 1 is a schematic block diagram of an electronic system, according to an example embodiment of the inventive concepts.

The inventive concepts now will be described more fully hereinafter with reference to the accompanying drawings, in which example embodiments are shown. The present disclosure may, however, be embodied in many different forms and should not be construed as limited to the example embodiments set forth herein. Rather, the example embodiments are provided so that this disclosure will be thorough and complete, and will fully convey the scope of the present disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
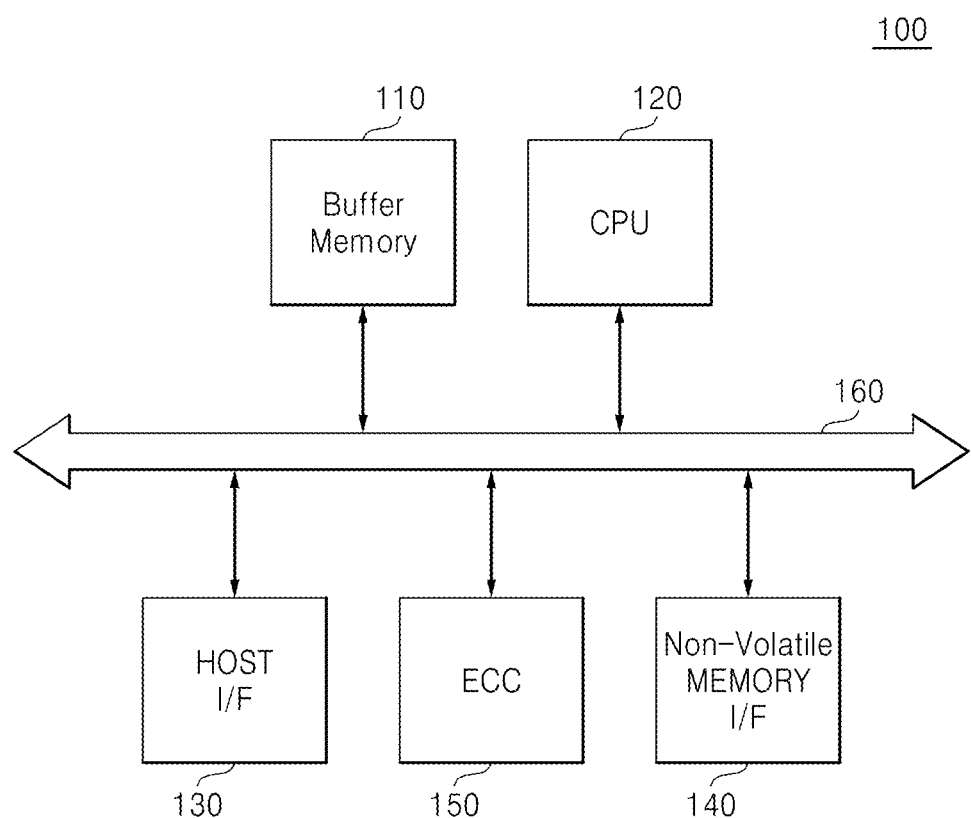
FIG. 2 is a block diagram of a memory controller of FIG. 1, according to an example embodiment of the inventive concepts.

FIG. 1 is a schematic block diagram of an electronic system 1, according to an example embodiment of the inventive concepts. FIG. 2 is a block diagram of a memory controller of FIG. 1, according to an example embodiment of the inventive concepts.

Referring to FIG. 1, the electronic system 1 includes a host 10 and a non-volatile memory system 20. The non-volatile memory system 20 connected to the host 10 includes a memory controller 100 and a non-volatile memory device 200.

The non-volatile memory system 20 according to an example embodiment of the inventive concepts may be a solid state drive (hereinafter referred to as 'SSD'), a multi-media card (MMC), an embedded multimedia card (eMMC), or a secure digital (SD) card but is not limited thereto. The non-volatile memory device 200 may be a flash memory device, but is not limited thereto and may be a phase-change random access memory (PRAM), magneto-resistive RAM (MRAM), a resistive RAM (ReRAM), or a ferroelectric RAM (FeRAM). When the non-volatile memory device 200 is a flash memory device, the non-volatile memory device 200 may be a floating gate type NAND flash memory device or a charge trap flash (CTF) type NAND flash memory device. Memory cell transistors of the non-volatile memory device 200 may have a two-dimensional (2D) arrangement structure or a three-dimensional (3D) arrangement structure, which will be described in detail below.

The memory controller 100 controls overall operations of the non-volatile memory system 20, and exchange of data between the host 10 and the non-volatile memory device 200. For example, the memory controller 100 controls the non-volatile memory device 200 to write or read data according to a request from the host 10. Also, the memory controller 100 controls a series of internal operations (e.g., performance control, merging, wear-leveling, etc.) needed to control the characteristics of the non-volatile memory device 200 or to effectively manage the non-volatile memory device 200.

The non-volatile memory device 200 provides a storage capacity for storing data in a non-volatile manner, and may store an operating system (OS), various programs, and various data.

Referring to FIG. 2, the structure of the memory controller 100 will now be described in detail. The memory controller 100 may include a buffer memory 110, a central processing unit (CPU) 120, a host interface 130, a non-volatile memory interface 140, an error correction code (ECC) block 150, and a bus 160.

The buffer memory 110 may be a volatile memory, e.g., a static RAM (SRAM), a dynamic RAM (DRAM), etc. but is not limited thereto. The buffer memory 110 serves as a buffer configured to temporarily data to be stored in or to be read from the non-volatile memory device 200. In this example embodiment, the buffer memory 110 is disposed inside the memory controller 100, but is not limited thereto and may be disposed outside the memory controller 100.

The host interface 130 includes an interface protocol for communicating with the host 10. The interface protocol for communicating with the host 10 may be a UHS (UHS-I or UHS-II), a peripheral component interconnect-express (PCI-E), advanced technology attachment (ATA), serial ATA (SATA), parallel ATA (PATA), or serial attached SCSI (SAS). However, the interface protocol for communicating between the host 10 and the non-volatile memory system 20 is not limited thereto, and may be one of any various interface protocols such as a universal serial bus (USB) protocol, a multi-media card (MMC) protocol, an enhanced small disk interface (ESDI) protocol, an integrated drive electronics (IDE) protocol.

The non-volatile memory interface 140 may interface exchange of data between the non-volatile memory device 200 and the memory controller 100.

The CPU 120 performs overall control operations for writing data to/reading data from the non-volatile memory device 200. The CPU 120 may control exchange of data among the buffer memory 110, the host interface 130, the ECC block 150, and the non-volatile memory interface 140 via the bus 160. The CPU 120 may also drive a flash translation layer (FTL). The FTL will be described in detail with reference to FIG. 5.

The ECC block 150 may encode data to be stored in the non-volatile memory device 200 and decode the data read from the non-volatile memory device 200 to detect and correct an error contained in the read data.

Although not shown, the non-volatile memory system 20 may further include a read only memory (ROM) for storing code data to be executed when the non-volatile memory system 20 is powered on, a clock module for generating a clock signal, a timer, etc.

Figure 3:
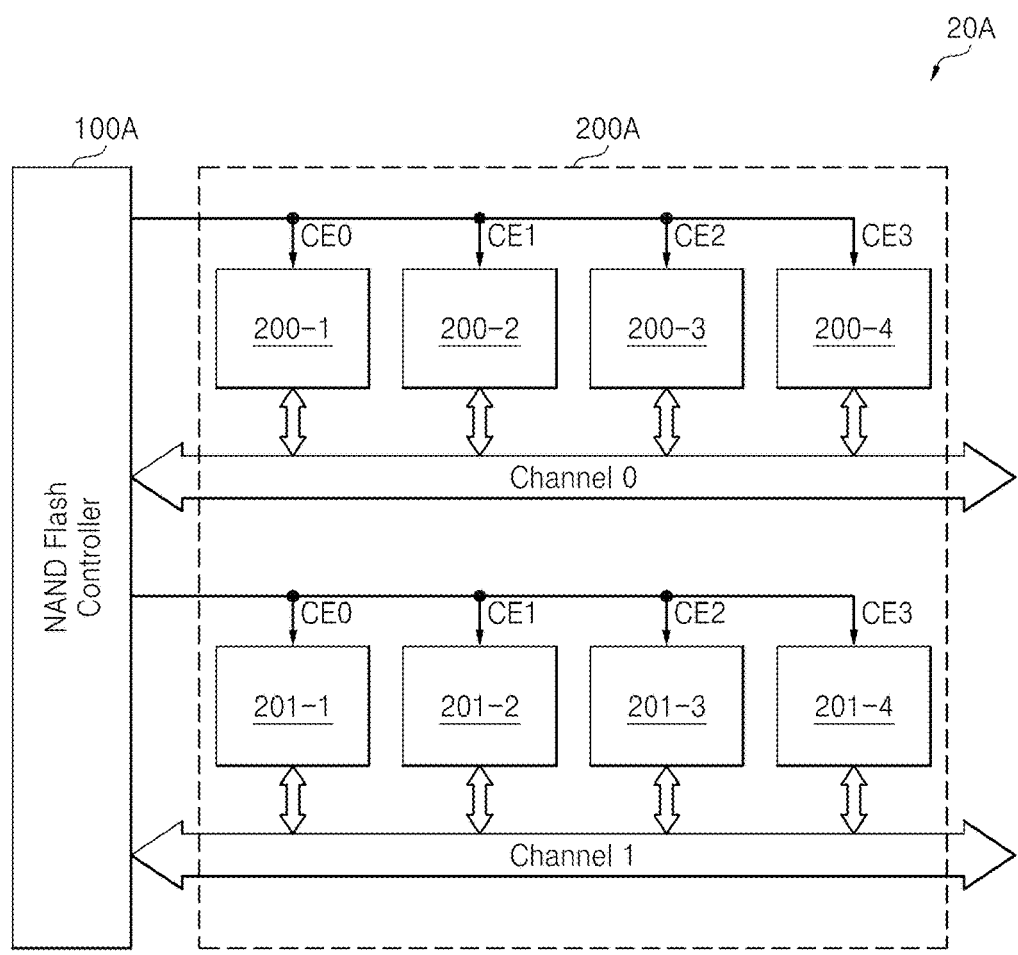
FIG. 3 is a diagram schematically illustrating the structure of a non-volatile memory system, according to an example embodiment of the inventive concepts.

FIG. 3 is a diagram schematically illustrating the structure of a non-volatile memory system, according to an example embodiment of the inventive concepts.

Referring to FIG. 3, the non-volatile memory system 20A includes a controller 100A and the non-volatile memory device 200A. The controller 100A may be a NAND flash controller, and the non-volatile memory device 200A may include a plurality of NAND flash memory devices 200-1 to 200-4 and 201-1 to 201-4. Although FIG. 3 illustrates that the non-volatile memory system 20A has a 2-channel/4-bank type hardware structure, the inventive concepts are not limited thereto. These NAND flash memory devices may be embodied as NAND flash chips.

In the non-volatile memory system 20A of FIG. 3, the NAND flash controller 100A and the non-volatile memory device 200A are connected via two channels, e.g., a first channel Channel 0 and a second channel Channel 1, and each of the first channel Channel 0 and the second channel Channel 1 is connected to four flash memory devices. For example, the first channel Channel 0 is connected to the four flash memory devices 200-1 to 200-4, and the second channel Channel 1 is connected to the four flash memory devices 201-1 to 201-4. Flash memory devices connected to the same channel share a control signal with an input/output (I/O) bus. The number of channels and the number of banks are, however, not limited to the above description and are variable.

The NAND flash controller 100A is capable of independently operating the first and second channels Channel 0 and Channel 1. That is, the NAND flash controller 100A is capable of simultaneously inputting a write command to two NAND flash chips (e.g., the NAND flash memory devices 200-1 and 201-1), and the two NAND flash chips (e.g., the NAND flash memory devices 200-1 and 201-1) are capable of simultaneously performing a write operation, thereby improving the performance of the write operation.

NAND flash chips (e.g., the NAND flash memory devices 200-1 to 200-4) connected to one channel may be selected by supplying different CE signals CE0 to CE3 thereto. It may not be possible to simultaneously input a command and data to a plurality of NAND flash chips in one channel. In other words, time periods in which a command and data are input to respective NAND flash chips may not overlap but page programming operations performed on the NAND flash chips may overlap. A technique using such system characteristics may be referred to as interleaving.

Figure 4:
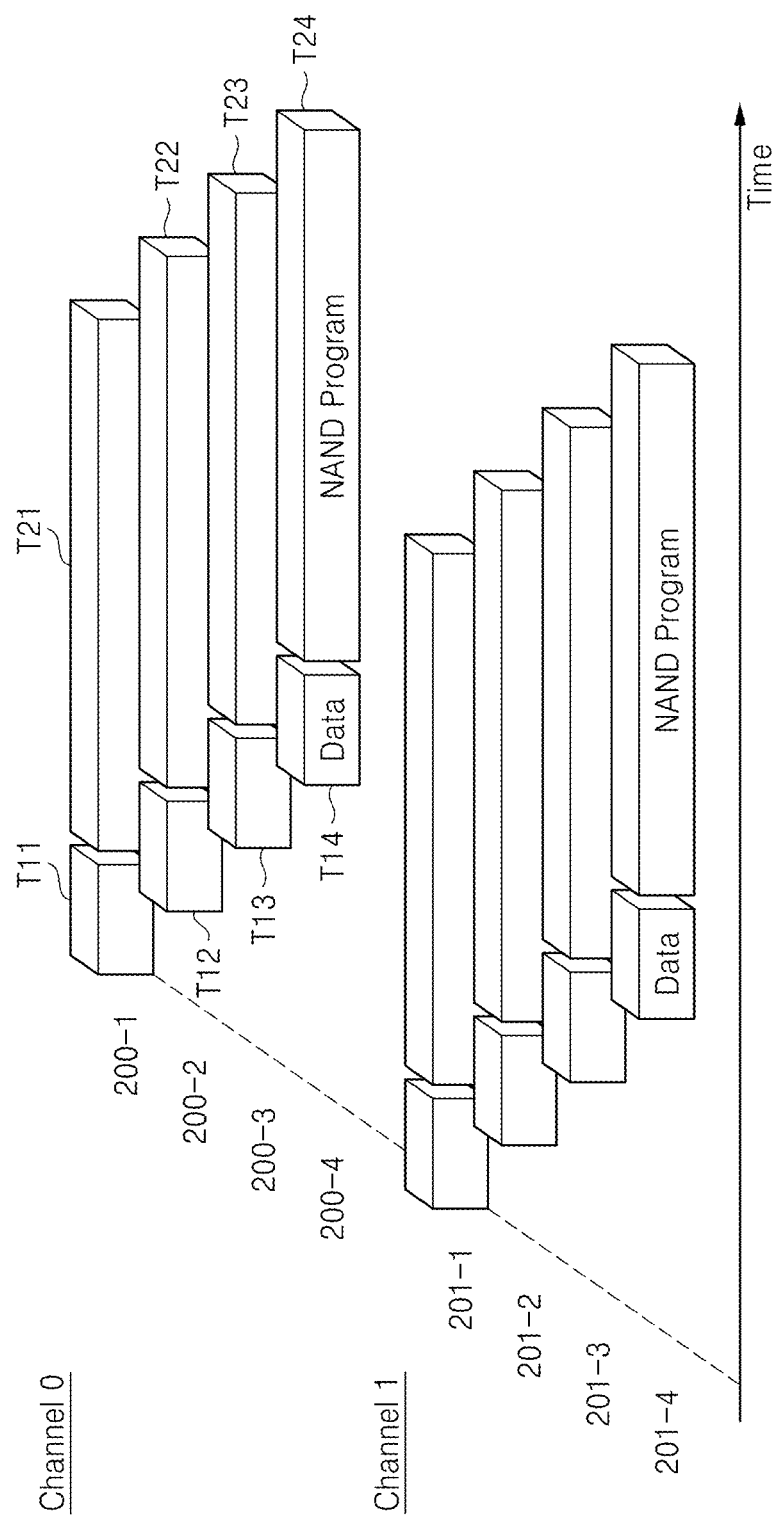
FIG. 4 is a diagram illustrating a write operation performed using interleaving in the non-volatile memory system of FIG. 3, according to an example embodiment.

FIG. 4 is a diagram illustrating a write operation performed using interleaving in the non-volatile memory system 20A of FIG. 3, according to an example embodiment. Referring to FIG. 4, a command and data are sequentially input to NAND flash chips in one channel (e.g., the NAND flash memory devices 200-1 to 200-4), but programming operations performed in the NAND flash chips in one channel (e.g., the NAND flash memory devices 200-1 to 200-4) may overlap. As illustrated in FIG. 4, time periods T11, T12, T13, and T14 in which a command and data are input to the respective NAND flash chips in one channel (e.g., the NAND flash memory devices 200-1 to 200-4) do not overlap and sequentially occur, but time periods T21, T22, T23, and T24 that page programming is performed on the respective NAND flash chips may overlap.

Also, a write operation using the first channel Channel 0 (e.g., inputting a write command and data to a flash chip connected to the first channel Channel 0, and programming of the flash chip) and such a write operation using the second channel Channel 1 are independent from each other and may thus be simultaneously performed.

Figure 5:
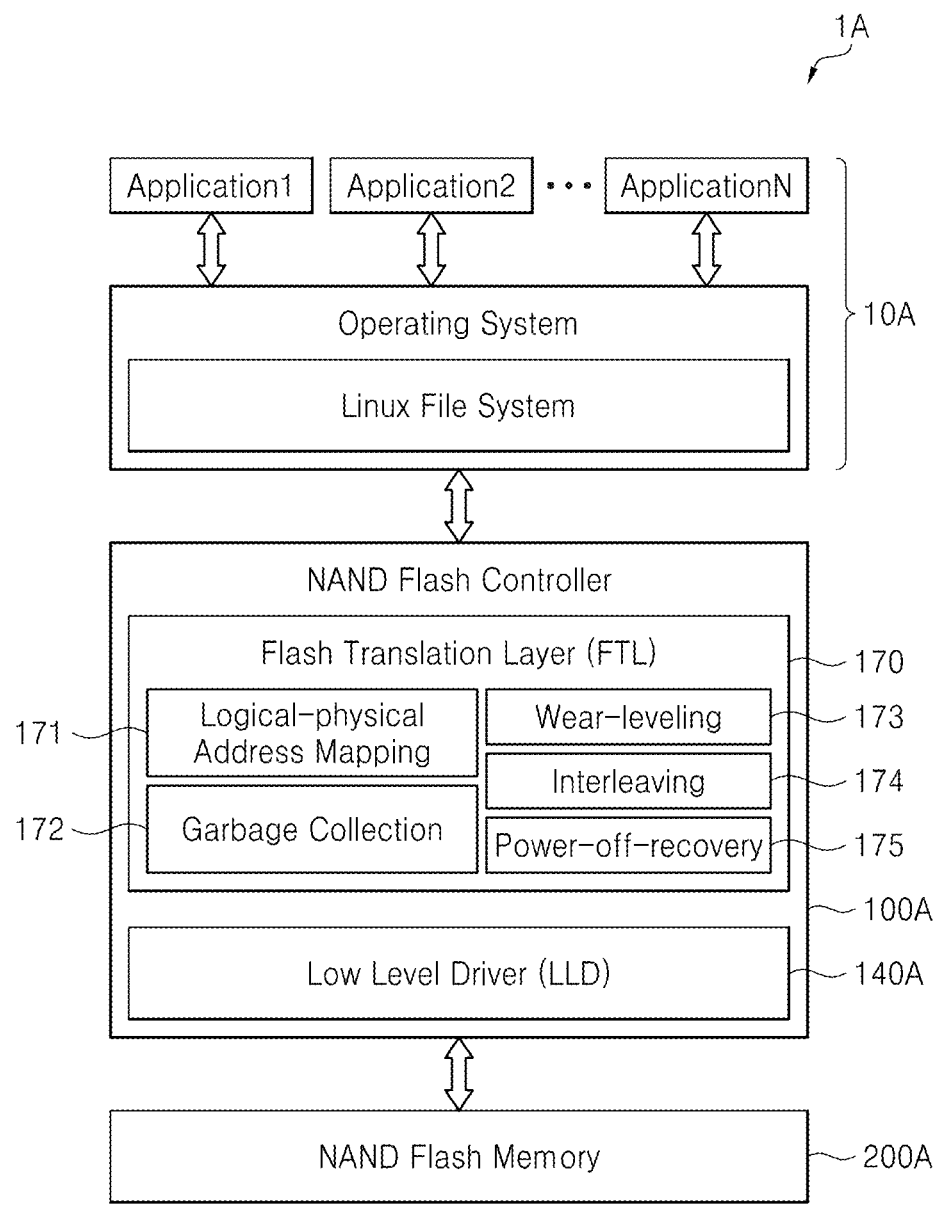
FIG. 5 is a diagram illustrating a hierarchical structure of a non-volatile memory system, according to an example embodiment of the inventive concepts.

FIG. 5 is a diagram illustrating a hierarchical structure of a non-volatile memory system, according to an example embodiment of the inventive concepts.

The non-volatile memory system 1A may include a host system 10A. The host system 10A may include an operating system (OS) and application programs Applicaion1 to ApplicationN that are run on the OS. A NAND flash controller 100A may include a flash translation layer (FTL) 170 and a low-level driver (LLD) 140A which is a memory device driver. In one example embodiment, the LLD 140A may be a part of the non-volatile memory interface 140 of FIG. 2.

The FTL 170 is a software layer for managing a flash memory device 200A. The FTL 170 is located between the host system 10A and the LLD 140A to enable the flash memory device 200A to be used without modifying a file system. The FTL 170 may functionally include a logical-physical address mapping unit 171, a garbage collection unit 172, a wear-leveling unit 173, an interleaving unit 174, and a power-off recovery unit 175.

The logical-physical address mapping unit 171 maps a logical address of a file system and a physical address of the flash memory device 200A to each other, based on an address mapping table. When a particular page is to be modified, the FTL 170 allocates a new page, stores data in the new page, and manages the particular page by updating the address mapping table.

The garbage collection unit 172 uses garbage collection to manage an effective page in a block of the flash memory device 200A. According to garbage collection, an effective page in a block of the flash memory device 200A is copied to a new block and the block is erased to be reused.

The wear-leveling unit 173 uses wear-leveling to increase the lifespan of the flash memory device 200A. Wear-leveling is a technique whereby number of times that respective blocks may be erased are managed to be substantially the same so as to prevent occurrence of a situation in which a particular block is worn faster other blocks and may become unusable.

The interleaving unit 174 is a functional block configured to support interleaving described above with reference to FIG. 4. The power-off recovery unit 175 provides a technique of recovering data damaged due to a sudden power failure. A series of internal operations performed to manage blocks of the flash memory device 200A may not only include garbage collection and wear-leveling but also include merging, performance control, etc.

Merging may mean an operation of collecting data that is discontinuously dispersed in the flash memory device 200A and writing the collected data to one block. Merging may be performed to make a free block when no free block (a block to which no data is written or an erased block) is present. Performance control may include an operation of arranging pages that are discontinuously dispersed, i.e., pages that are divided into fragments, and collecting the arranged pages in one place.

The LLD 140A is a layer for providing a NAND flash interface to directly access the flash memory device 200A.

Figure 6:
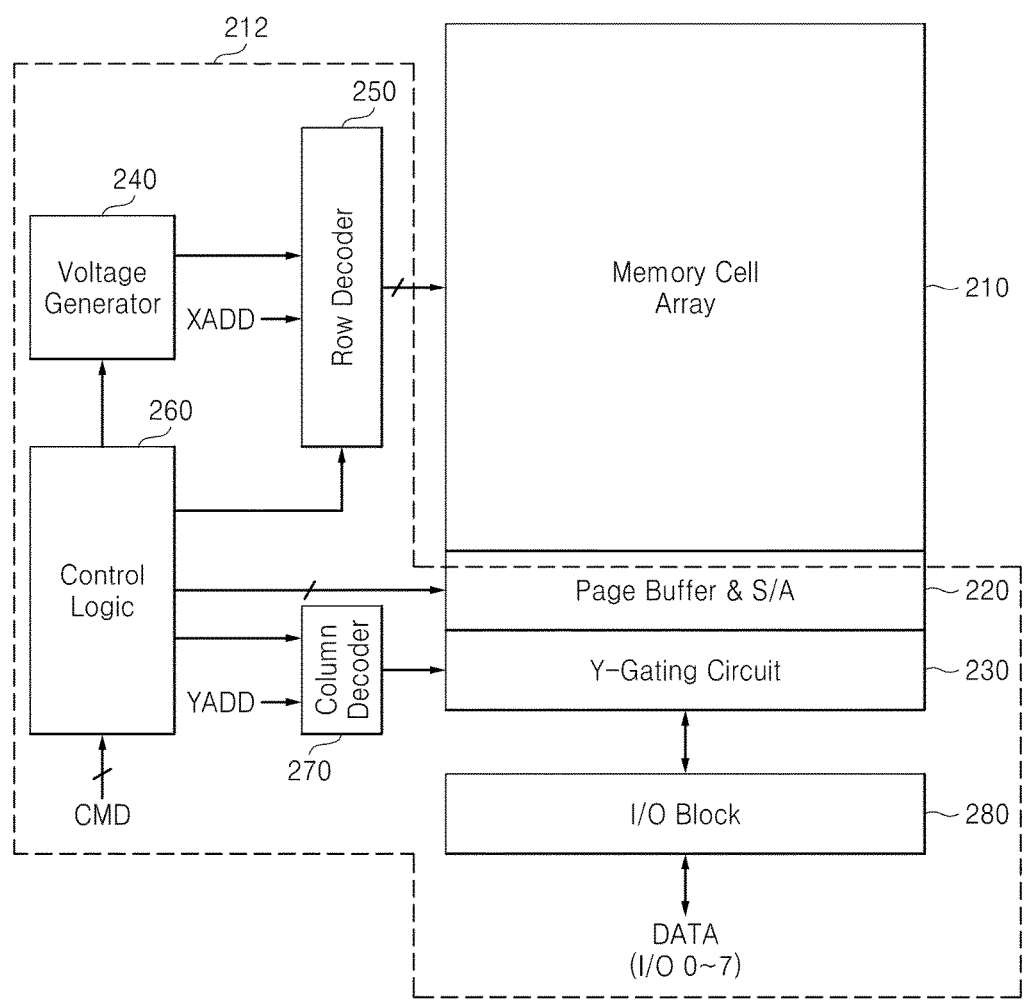
FIG. 6 is a detailed block diagram of a flash memory device shown in FIG. 3, according to an example embodiment of the inventive concepts.
Figure 7:
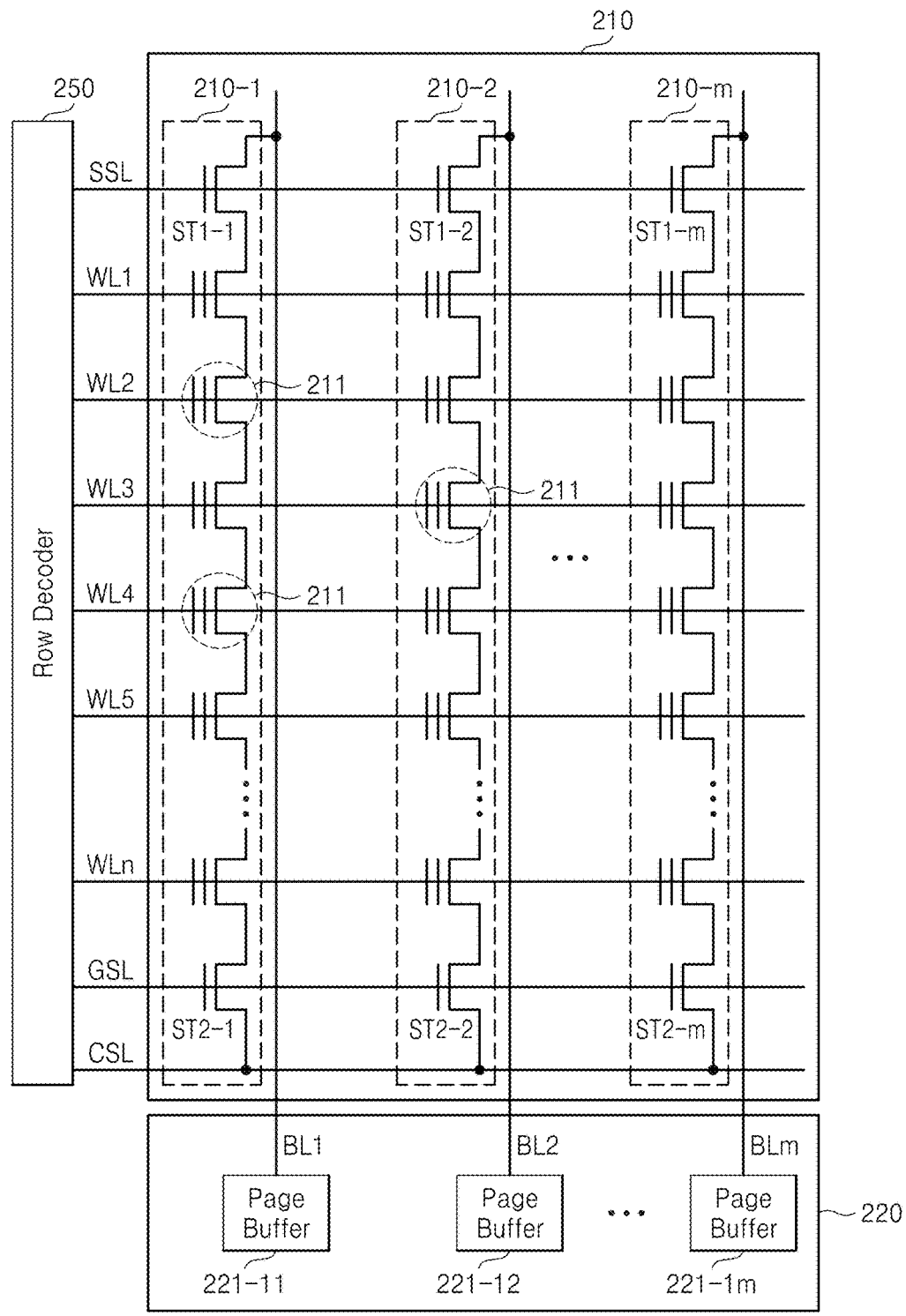
FIG. 7 is a detailed circuit diagram of a memory cell array of FIG. 6, according to an example embodiment of the inventive concepts.
Figure 8:
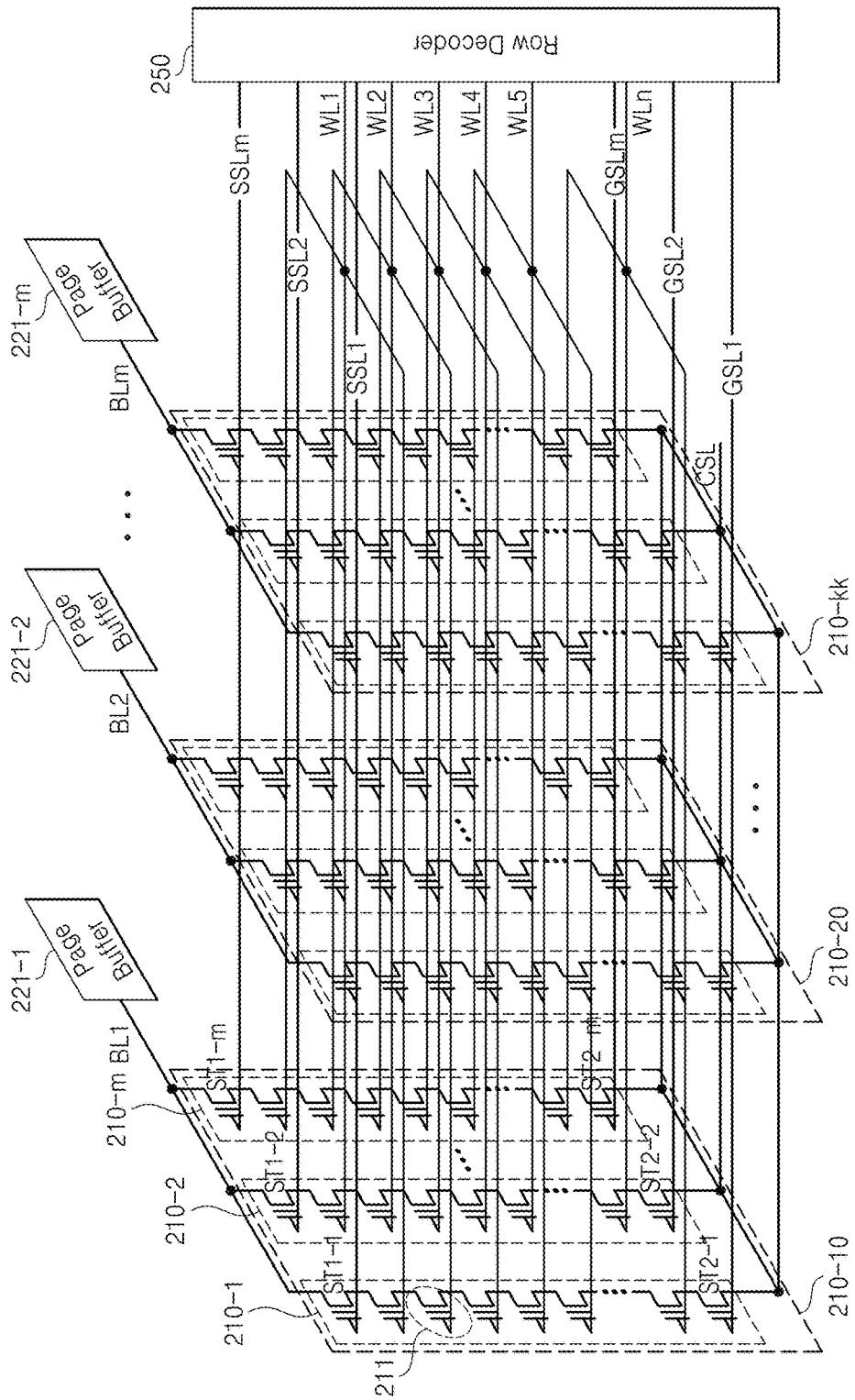
FIG. 8 is a detailed circuit diagram of the memory cell array of FIG. 6, according to an example embodiment of the inventive concepts.

FIG. 6 is a detailed block diagram of a flash memory device shown in FIG. 3, according to an example embodiment of the inventive concepts. FIG. 7 is a detailed circuit diagram of a memory cell array of FIG. 6, according to an example embodiment of the inventive concepts. FIG. 8 is a detailed circuit diagram of the memory cell array of FIG. 6, according to an example embodiment of the inventive concepts.

Referring to FIG. 6, the flash memory device 200-1 includes a memory cell array 210 and an access circuit 212.

The memory cell array 210 includes NAND memory cell strings 210-1 to 210-$m$ connected to bit lines BL1 to BLm, respectively, and the NAND memory cell strings each include a plurality of non-volatile memory cells connected in series. Each of the NAND memory cell strings may be disposed or embodied on a two-dimensional plane or layer as illustrated in FIG. 7. According to one example embodiment of the inventive concepts the memory cell array 210 may be three-dimensionally arranged by stacking wafers, chips, or cells as illustrated in FIG. 8.

Referring to FIGS. 7 and 8, NAND memory cell strings each include a plurality of non-volatile memory cells 211 (few non-volatile memory cells are numbered in FIG. 7, for illustrative purposes). The plurality of non-volatile memory cells 211 associated with each of the NAND memory cell strings 210-1 to 210-$m$ are connected in series between a corresponding one of string selection transistors ST1-1 to ST1-$m$ and a corresponding one of the ground selection transistors ST2-1 to ST2-m. A corresponding of bit lines BL1 to BLm is connected to the string selection transistors ST1-1 to ST1-$m$ (e.g., BL1 is connected to ST1-1, etc.). Furthermore, the ground selection transistors ST2-1 to ST2-$m$ are connected to a common source line (CSL).

Gates of the string selection transistors ST1-1 to ST1-$m$ are connected to a string selection line (SSL), gates of the respective non-volatile memory cells 211 are connected to a plurality of word lines WL1 to WLn, respectively, and gates of the ground selection transistor ST2-1 to ST2-$m$ are connected to a ground selection line (GSL). The NAND memory cell strings 210-1 to 210-$m$ are connected to a corresponding one of page buffers 221-11 to 221-1$m$ of FIG. 7 (or page buffers 221-1 to 221-$m$ of FIG. 8), respectively. The number of word lines may vary according to different example embodiments.

FIG. 8 illustrates multiple memory cell arrays 210-10, 210-20, . . . , 210-$kk$ forming a three dimensional (3D) arrangement structure. Each of the memory cell arrays 210-10 to 210-$kk$ may be the same as the memory cell array 210 described with reference to FIG. 7.

Each of the non-volatile memory cells 211 included in each of the NAND memory cell strings may be embodied as a flash electrically erasable programmable read-only memory (EEPROM) capable of storing 1-bit data or more.

Thus, each of the non-volatile memory cells 211 may be embodied as a NAND flash memory cell capable of storing 1-bit data or more, e.g., a multi-level cell (MLC).

The access circuit 212 accesses the memory cell array 210 to perform a data access operation (e.g., a program operation, a read operation, or an erase operation) according to a command (or command sets) and an address received from the outside, (e.g., the memory controller 100). The access circuit 212 may include a voltage generator 240, a row decoder 250, a control logic 260, a column decoder 270, a page buffer & sense amplifier block 220, a Y-gating circuit 230, and an input/output (I/O) block 280.

The voltage generator 240 may generate a voltage needed to perform a data access operation according to control code generated by the control logic 260. The voltage generator 240 generates a program voltage Vpgm and a program verification voltage Vpvfy for performing a program operation, generate a read voltages Vrd for performing a read operation, generates an erase voltage Verase and an erase verification voltage Vevfy for performing an erase operation, and then outputs an appropriate one of such voltages, to perform a desired operation, to the row decoder 250.

The control logic 260 controls overall operations of the access circuit 212 according to a control signal CMD received from the memory controller 100. For example, the control logic 260 may control information regarding a memory read state to be sensed during a memory read operation and the read data to be output to the memory controller 100.

The column decoder 270 decodes column addresses YADD and outputs a plurality of selection signals to the Y-gating circuit 230, under the control of the control logic 260.

The page buffer & sense amplifier block 220 includes a plurality of page buffers PB. The plurality of page buffers PB are connected to a plurality of bit lines, respectively.

The plurality of page buffers PB may be each operated as a driver for temporarily storing data read from the memory cell array 210 during a data read operation, under the control of the control logic 260. Also, the plurality of page buffers PB may be operated as sense amplifiers for sensing and amplifying voltages of the plurality of respective bit lines during a read operation, under control of the control logic 260.

The Y-gating circuit 230 may control data transmission between the page buffer & sense amplifier block 220 and the I/O block 280 according to the plurality of selection signals received from the column decoder 270.

The I/O block 280 may transmit data DATA received from the outside to the Y-gating circuit 230 or transmit data DATA received from the Y-gating circuit 230 to the memory controller 100 via a plurality of I/O pins (or via a data bus).

Figure 9:
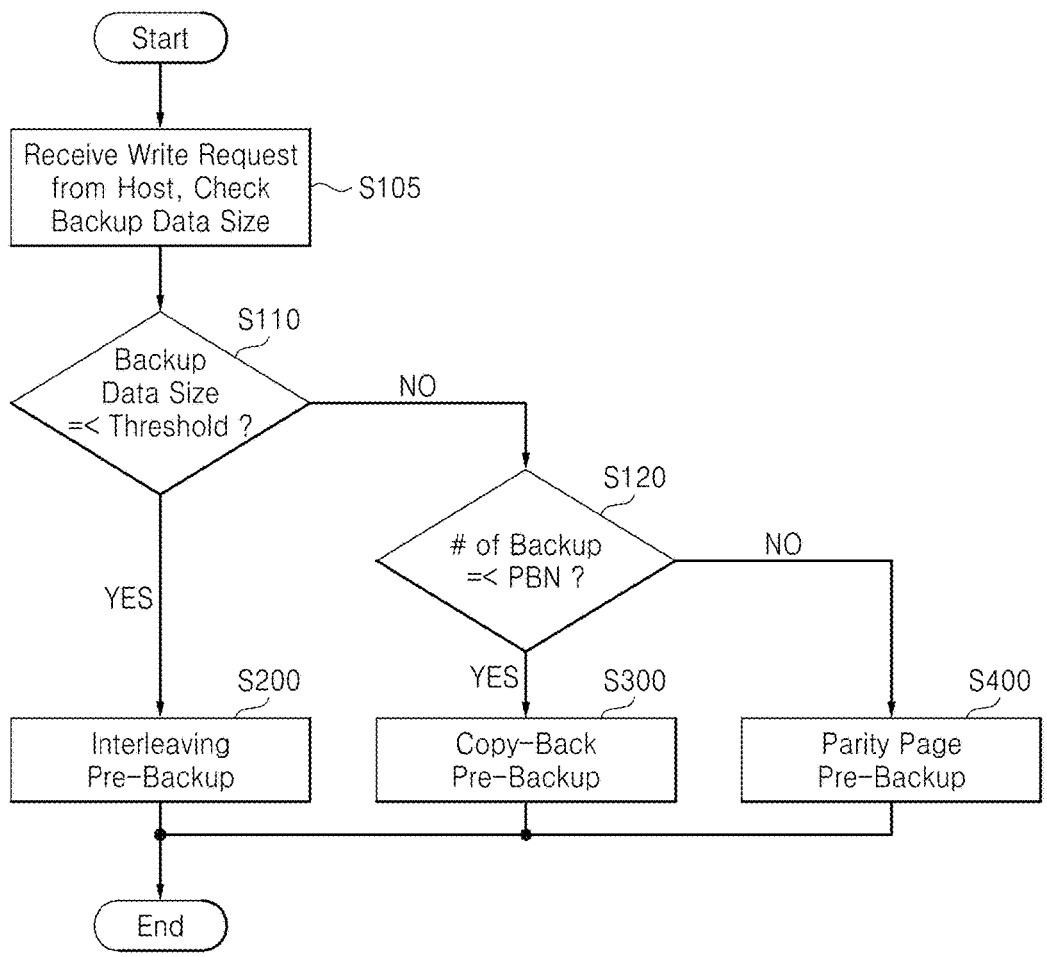
FIG. 9 is a flowchart illustrating an adaptive paired page pre-backup method, according to an example embodiment of the inventive concepts.

FIG. 9 is a flowchart illustrating an adaptive paired page pre-backup method, according to an example embodiment of the inventive concepts. The method of FIG. 9 may be performed by a non-volatile memory system according to an example embodiment of the inventive concepts as described above.

Referring to FIG. 9, a memory controller 100 receives a write request from a host, and checks the size of data (e.g., LSB data) to be backed up among data requested to be written in the write request (S105).

At S110, the memory controller 100 determines whether the size of the data that is to be backed up (hereinafter referred to as "backup data size") is less than or equal to a threshold (or, alternatively predetermined) data size. If at S110, the memory controller 100 determines that the size of the data to be backed up is less than or equal to the threshold data size, the memory controller 100 selects a first backup type from among a plurality of backup types (e.g., two or more backup types) (S200). In one example embodiment, the first backup type is an interleaving pre-backup. Thus, when the backup data size is less than or equal to the threshold data size, interleaving pre-backup is performed.

In one example embodiment, the backup data size means the size (amount) of data (e.g., least significant bit (LSB) data) to be backed up among data requested to be written. The backup data size may be a page unit. For example, the backup data size may be represented using the number of LSB pages to be programmed, and interleaving pre-backup is performed when the backup data size is less than or equal to a reference number of pages.

In one example embodiment, the threshold data size may be a half the number of all pages that may be simultaneously programmed in a non-volatile memory device. The number of all the pages that may be simultaneously programmed in the non-volatile memory device may be equal to the product of the number of channels N, the number of banks, and the number of planes. For example, in the example embodiment of FIG. 3, all the pages that may be simultaneously programmed in a non-volatile memory device may be equal to (the number of channels '2'*the number of banks '4'*the number of planes). The threshold data size may be a page size corresponding to N/2 channels. The page size corresponding to the N/2 channels may be the number of pages that maybe simultaneously programmed with the N/2 channels.

The threshold data size may be a fixed value or may be variable. For example, when some of N channels are in a 'busy' state, the number of pages that may be simultaneously programmed may vary and the threshold data size may also vary.

If, at S110, the memory controller 100 determines that the backup data size is greater than the threshold data size (e.g., a reference number of pages), the memory controller 100 checks a number of times of backing up (S120). The memory controller 100 checks whether the number of times of backing up (# of backup) is less than or equal to a reference number of times PBN, (e.g., '1'), and a second backup type is selected when the number of times of backing up (# of backup) is less than or equal to the reference number of times PBN (S300). The memory controller 100 selects a third backup type when the number of times of backing up (# of backup) is not less than or equal to the reference number of times PBN (operation S400). The reference number of times PBN may be an integer that is equal to or greater than '1' and may be determined based on empirical studies.

In one example embodiment, the second backup type is a copy-back pre-backup and the third backup type is a parity page pre-backup.

Thus, the copy-back pre-backup is performed when the backup data size is greater than the threshold data size and the number of times of backing up is less than or equal to the reference number of times PBN. The parity page pre-backup is performed when the backup data size is greater than the threshold data size and the number of times of backing up is greater than the reference number of times PBN.

The number of times of backing up is a value that varies according to the backup data size. For example, the number of times of backing up may be '1' when the backup data size is less than or equal to the number of all pages that may be simultaneously programmed in a non-volatile memory device, and may be '2' when the backup data size is greater than the number of all the pages that may be simultaneously programmed in the non-volatile memory device and is twice or more than the number of all the pages that may be simultaneously programmed in the non-volatile memory device. Thus, at S120, the reference number of times PBN may be set to a desired (or, alternatively predetermined) size rather than the reference number of times and the backup data size may be compared with the desired size to determine whether the copy-back pre-backup or the parity page pre-backup is to be performed.

The desired size may be the number of all pages that may be simultaneously programmed in the non-volatile memory device. However, the desired size may not be a fixed value similar to the reference number of pages described above and may be variable. For example, when some of N channels are in the 'busy' state, the number of pages that may be simultaneously programmed may vary and the desired size may also vary.

As described above, according to one example embodiment, a write request is received from a host, a backup data size and a number of times of backing up are determined, and a backup type is then adaptively determined based on the backup data size and the number of times of backing up.

The interleaving pre-backup, the copy-back pre-backup, and the parity page pre-backup will now be described in detail based on an assumption that the total number of channels of the non-volatile memory system according to an example embodiment of the inventive concepts is '2'. However, the number of channels is not limited to '2' and the inventive concepts may be applied to a case in which the number of channels is 'N' (N denotes an integer that is equal to or greater than '2').

Figure 10:
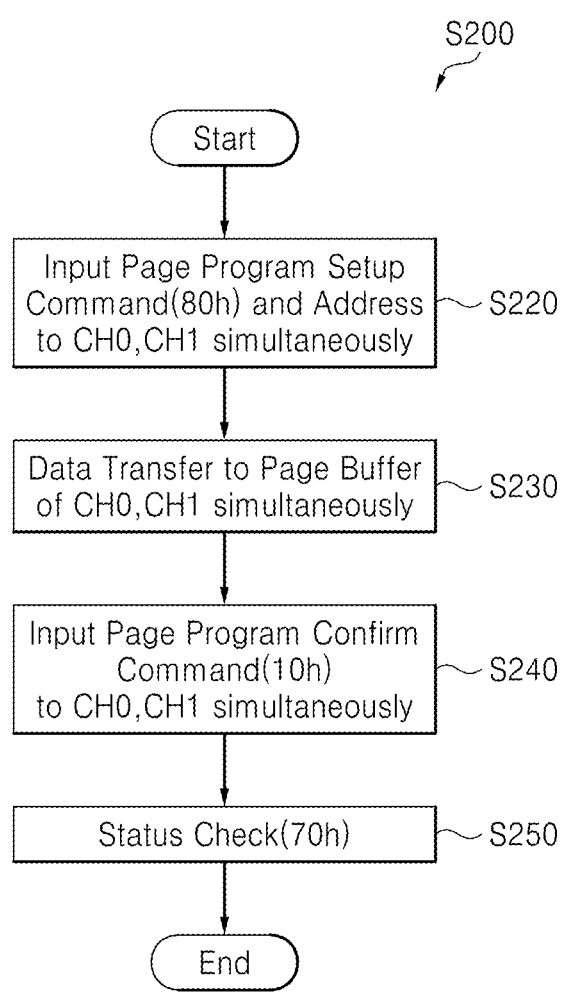
FIG. 10 is a flowchart illustrating the interleaving pre-backup method, according to an example embodiment of the inventive concepts.
Figure 11:
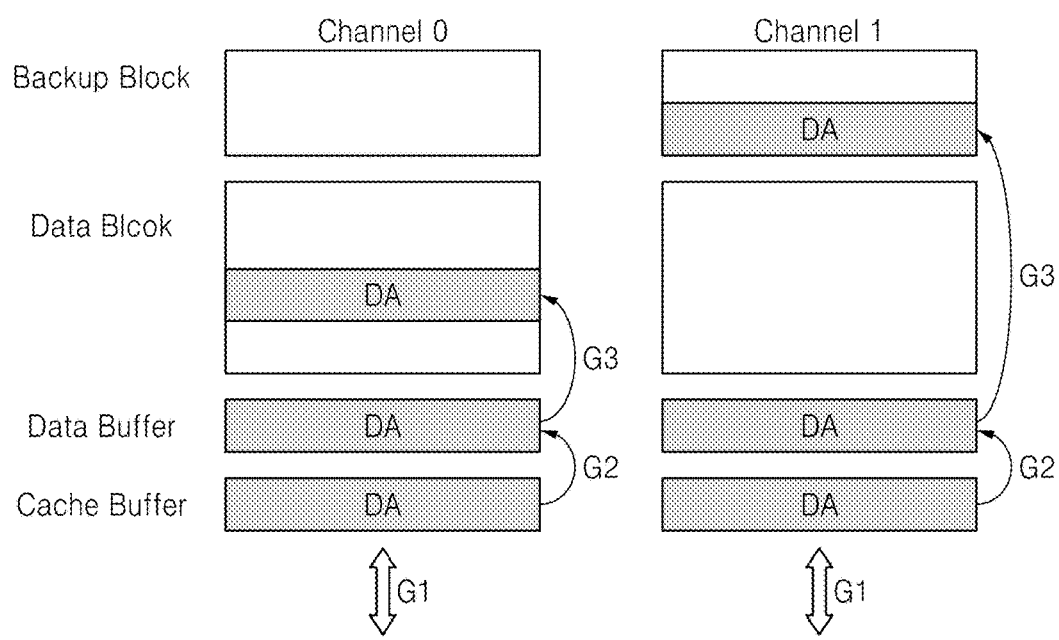
FIG. 11 is a diagram illustrating the interleaving pre-backup method, according to an example embodiment of the inventive concepts.

FIG. 10 is a flowchart illustrating an interleaving pre-backup method, according to an example embodiment of the inventive concepts. FIG. 11 is a diagram illustrating the interleaving pre-backup method, according to an example embodiment of the inventive concepts.

Referring to FIGS. 10 and 11, an interleaving pre-backup technique according to an example embodiment of the inventive concepts may be used when a backup data size corresponds to one channel (e.g., when the backup data size is less than or equal to the number of pages that may be simultaneously programmed using one channel). In this case, another channel is in an idle state and a backup time period may be reduced using a channel interleaving technique. If the number of channels is 'N' (N denotes an integer that is equal to or greater than '2'), the interleaving pre-backup technique may be used when the backup data size (e.g., the number of times of backing up data pages) corresponds to N/2 channels (e.g., when the backup data size is less than or equal to the number of pages that may be simultaneously programmed using the N/2 channels).

An FTL simultaneously applies a page program setup command (e.g., '80h') to a first channel Channel 0 and a second channel Channel 1, and simultaneously applies a first and second channel addresses to these channels, respectively (S220).

At S220, the page program setup command (e.g., '80h') is commonly applied to the first and second channels Channel 0 and Channel 1. The first and second channel addresses may be different and simultaneously applied to the first channel Channel 0 and the second channel Channel 1, respectively. For example, the first channel address is an address based on which a memory device (e.g., a flash chip) connected to the first channel Channel 0 designates a page of a data block to which the LSB data is to be written, and the second channel address is an address based on which a memory device connected to the second channel Channel 1 designates a page of a backup block to which the LSB data is to be backed up.

Then, LSB data requested to be written is simultaneously transmitted to page buffers of these memory devices via the first and second channels Channel 0 and Channel 1 (S230). Write data transmitted to the first channel Channel 0 and write data transmitted to the second channel Channel 1 are the same data. For example, the same data is written using the first channel Channel 0 and is backed up using the second channel Channel 1.

When the LSB data is transmitted to page buffers of the respective first and second channels Channel 0 and Channel 1 via the first and second channels Channel 0 and Channel 1, the LSB data is input to cache buffers of the respective first and second channels Channel 0 and Channel 1 as illustrated in FIG. 11 (indicated by an arrow 'G1'). The page buffers may each include a cache buffer and a data buffer as illustrated in FIG. 11, 14, 17A, or 17B.

Then, a memory controller simultaneously and commonly inputs a page program confirm command (e.g., '10h') to the first and second channels Channel 0 and Channel 1 (S240).

Then, as illustrated in FIG. 11, flash memory devices (e.g., NAND flash chips) corresponding to the first and second channels Channel 0 and Channel 1 store the LSB data stored in the cache buffers to the data buffers, respectively (indicated by an arrow G2), and the LSB data stored in the data buffers are programmed to pages corresponding to the first and second channel addresses (indicated by an arrow G3).

For example, the memory device corresponding to the first channel Channel 0 programs LSB data stored in a first data buffer to a designated page of a designated data block, and the memory device corresponding to the second channel Channel 1 programs LSB data stored in a second data buffer to a designated page of a designated backup block, as indicated with the arrow G3.

Referring back to FIG. 10, a memory controller may apply a state check command (e.g., '70h') to the memory devices, and check whether programming and back-up programming of the original data is completed in each of the memory devices (operation S250).

Figure 12:
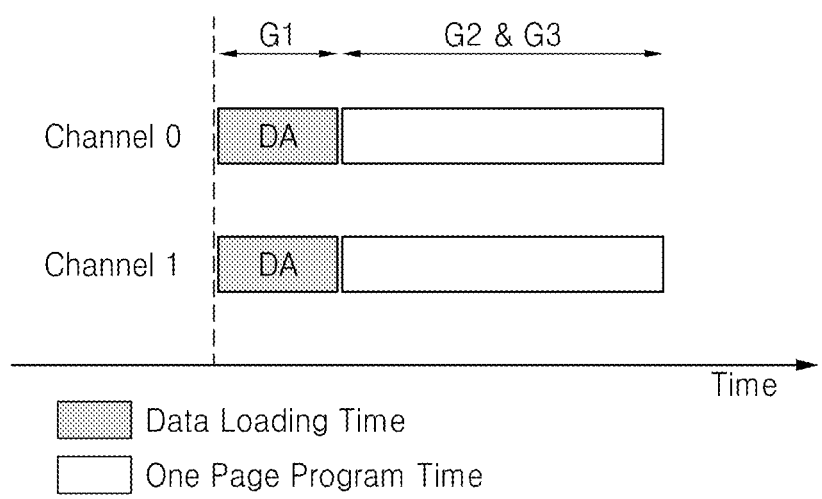
FIG. 12 is a schematic timing diagram illustrating the interleaving pre-backup method, according to an example embodiment of the inventive concepts.

FIG. 12 is a schematic timing diagram illustrating an interleaving pre-backup method, according to an example embodiment of the inventive concepts. As illustrated in FIG. 12, according to the interleaving pre-backup method, data is simultaneously transmitted to a page buffer (e.g., a cache buffer) of a first channel Channel 0 and a page buffer (e.g., a cache buffer) of a second channel Channel 1 (as indicated by an arrow G1), and programming of the original data in the first channel Channel 0 and programming of backup data in the second channel Channel 1 are simultaneously performed (as indicated by arrows G2 & G3).

As described above, programming and backing up of the original data are simultaneously performed, thereby reducing a backup time period by using the interleaving pre-backup technique. This technique may be applied when a backup data size is less than or equal to a half the total number of channels.

Figure 13:
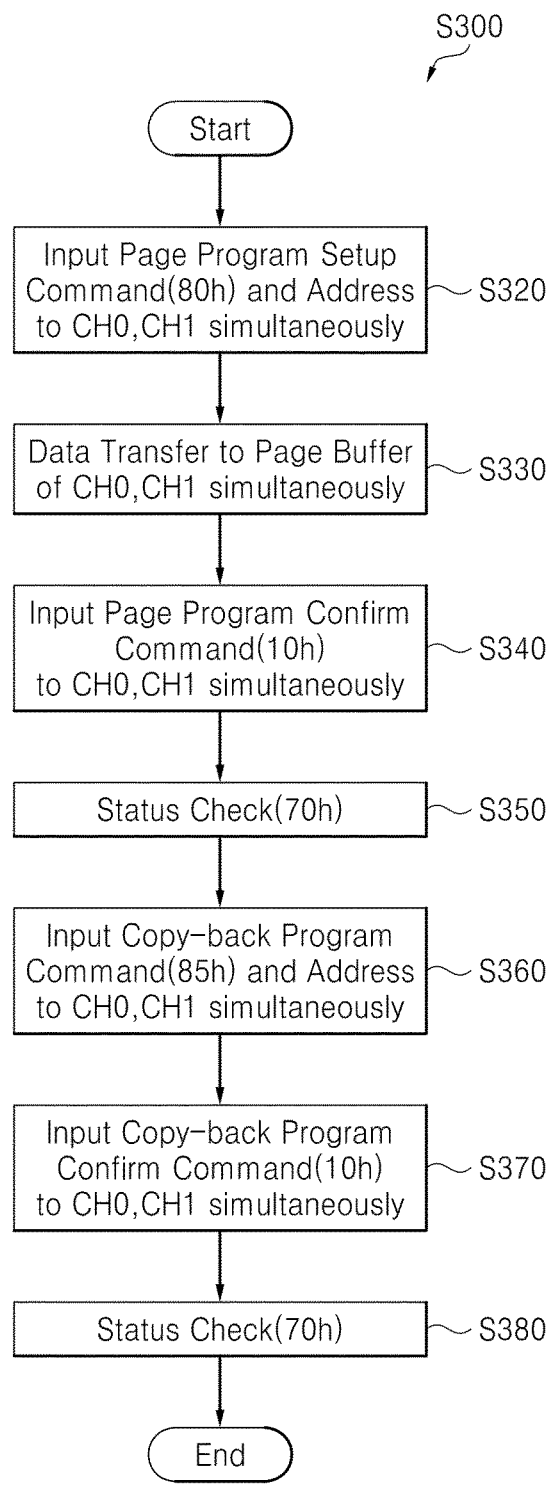
FIG. 13 is a flowchart illustrating a copy-back pre-backup method, according to an example embodiment of the inventive concepts.
Figure 14:
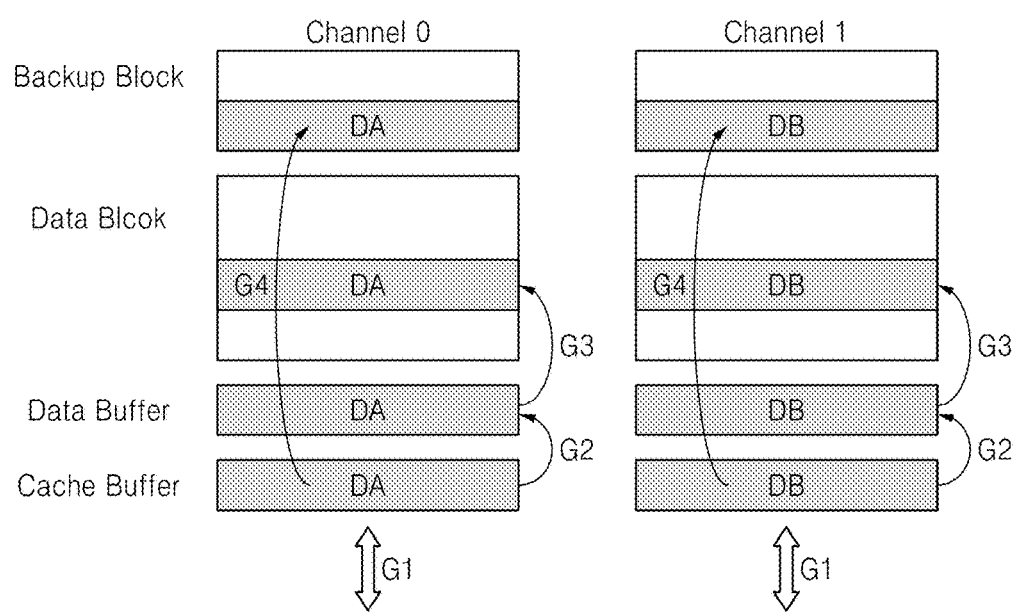
FIG. 14 is a diagram illustrating the copy-back pre-backup method, according to an example embodiment of the inventive concepts.

FIG. 13 is a flowchart illustrating a copy-back pre-backup method, according to an example embodiment of the inventive concepts. FIG. 14 is a diagram illustrating the copy-back pre-backup method, according to an example embodiment of the inventive concepts.

The copy-back pre-backup method according to an example embodiment of the inventive concepts is a backup technique using a copy-back operation of a NAND flash memory, and may be applied when the size of data that is to be backed up (i.e., a backup data size) among data requested to be written is greater than a threshold data size and a number of times of backing up is '1'. If the number of channels is 'N', the backup data size (e.g., the number of backup data pages) is greater than the size of N/2 channels and the number of times of backing up is '1', the copy-back pre-backup method may be used.

That the backup data size (e.g., the number of backing up data pages) is greater than the size of the N/2 channels means that the backup data size is greater than the number of pages that may be simultaneously programmed using the N/2 channels.

Even after programming of one page in a NAND flash memory is completed, data stored in the page still remains in a page buffer. By using the data to back up the NAND flash memory, overhead caused by data retransmission may be reduced.

Referring to FIGS. 13 and 14, a memory controller simultaneously and commonly applies a page program setup command (e.g., '80h') to the first and second channels Channel 0 and Channel 1, and simultaneously applies first and second channel addresses to the first and second channels Channel 0 and Channel 1, respectively (S320).

Then, first LSB data DA and second LSB data DB are simultaneously transmitted to the page buffers of the first and second channels Channel 0 and Channel 1 via the first and second channels Channel 0 and Channel 1, respectively (S330). The first LSB data DA transmitted to the first channel Channel 0 is one part of LSB data requested to be written, and the second LSB data DB transmitted to the second channel Channel 1 is another part of the LSB data requested to be written. Thus, the first LSB data DA and the second LSB data DB are different data.

A first channel address is an address for designating a page of a data block to which the first LSB data DA is to be written by a memory device (e.g., a flash chip) connected to the first channel Channel 0. A second channel address is an address for designating a page of a data block to which the second LSB data DB is to be written by a memory device (e.g., a flash chip) connected to the second channel Channel 1.

As illustrated in FIG. 14, the first LSB data DA transmitted via the first channel Channel 0 is input to the cache buffer of the first channel Channel 0, and the second LSB data DB transmitted via the second channel Channel 1 is input to the cache memory of the second channel Channel 1 (as indicated by 'G1').

Next, the memory controller simultaneously and commonly applies a page program confirm command (e.g., '10h') to the first and second channels Channel 0 and Channel 1 (S340).

Then, as illustrated in FIG. 14, non-volatile memory devices corresponding to the respective first and second channels Channel 0 and Channel 1 store the first LSB data DA and the second LSB data DB stored in the respective cache buffers of the first and second channels Channel 0 and Channel 1 in the data buffers corresponding thereto, respectively (indicated by an arrow G2), and program the first and second LSB data DA and DB stored in the data buffers to pages corresponding to the first and second channel addresses (indicated by an arrow G3).

For example, a memory device corresponding to the first channel Channel 0 programs the first LSB data DA stored in the first data buffer to a designated page of a designated data block (as indicated by an arrow G3), and a memory device corresponding to the second channel Channel 1 programs the second LSB data DB stored in the second data buffer to a designated page of a designated data block (as indicated by an arrow G3).

Referring back to FIG. 13, the memory controller may check whether the programming of the first and second LSB data DA and DB in the memory devices is completed by applying a state check command (e.g., '70h') to the memory devices (S350).

If the programming of the first and second LSB data DA and DB in the memory devices is completed, the memory controller commonly applies a copy-back program command (e.g., '85h') to the first and second channels Channel 0 and Channel 1, and simultaneously applies a third channel address and a fourth channel address to the first channel Channel 0 and the second channel Channel 1, respectively (S360).

In this case, the third channel address is an address for designating a page of a backup block to which the first LSB data DA is to be backed up by a memory device (e.g., a flash chip) that is connected to the first channel Channel 0, and the fourth channel address is an address for designating a page of a backup block to which the second LSB data DB is to be backed up by a memory device (e.g., a flash chip) that is connected to the second channel Channel 1.

In this case, the first and second LSB data DA and DB do not need to be retransmitted to the page buffers of the first and second channels Channel 0 and Channel 1 via the first and second channels Channel 0 and Channel 1. This is because the first and second LSB data DA and DB remain in the respective page buffers (e.g., cache buffers or data buffers) of the first and second channels Channel 0 and Channel 1. Accordingly, the data may be directly backed up to a backup block without being reloaded.

Then, a copy-back program confirm command (e.g., '10h') is simultaneously and commonly applied to the first and second channels Channel 0 and Channel 1 (operation S370).

Then, as illustrated in FIG. 14, non-volatile memory devices corresponding to the first and second channels Channel 0 and Channel 1 are backed up by programming the first and second LSB data DA and DB stored in the cache buffers to pages corresponding to the first and second channel addresses, respectively (G4).

For example, the memory device corresponding to the first channel Channel 0 programs the first LSB data DA stored in the first cache buffer to a designated page of a designated backup block (as indicated by an arrow G4), and the memory device corresponding to the second channel Channel 1 programs the second LSB data DB stored in the second cache buffer to a designated page of a designated backup block (as indicated by an arrow G4).

Referring back to FIG. 13, the memory controller may check whether backup programming of the first and second LSB data DA and DB in respective memory devices is completed by applying a state check command (e.g., '70h') to the memory devices (operation S380).

Figure 15:
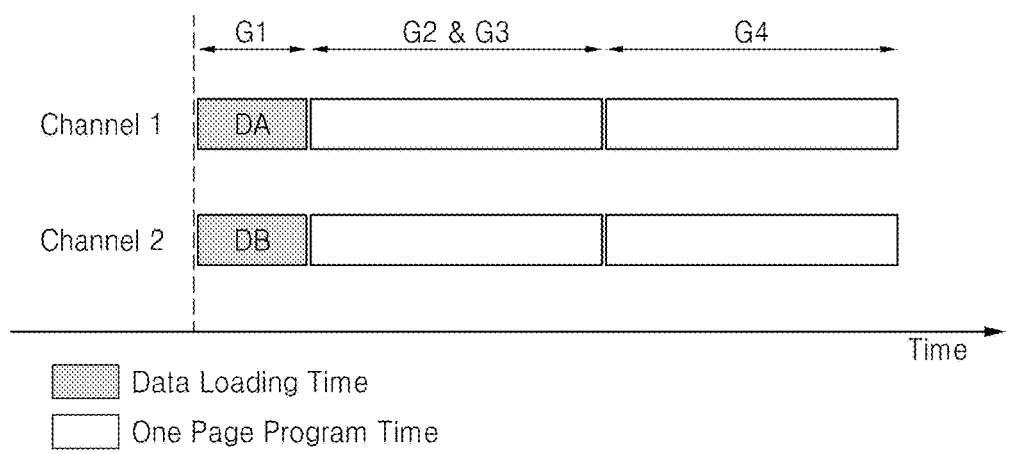
FIG. 15 is a schematic timing diagram illustrating the copy-back pre-backup method, according to an example embodiment of the inventive concepts.

FIG. 15 is a schematic timing diagram illustrating the copy-back pre-backup method, according to an example embodiment of the inventive concepts. As illustrated in FIG. 15, according to the copy-back pre-backup method, transmission of the first LSB data DA to the page buffer (e.g., cache buffer) of the first channel Channel 0 and transmission of the second LSB data DB to the page buffer (e.g., cache buffer) of the second channel Channel 1 are performed in parallel (as indicated by an arrow G1), and programming of the first LSB data DA and programming of the second LSB data Db are performed in parallel in the respective memory device (as indicated by arrows G2 & G3).

Then, the first LSB data (DA) and the second LSB data (DB) remaining in the page buffers are simultaneously programmed to backup blocks without reloading the first and second LSB data DA and DB (as indicated by an arrow G4).

Figure 16:
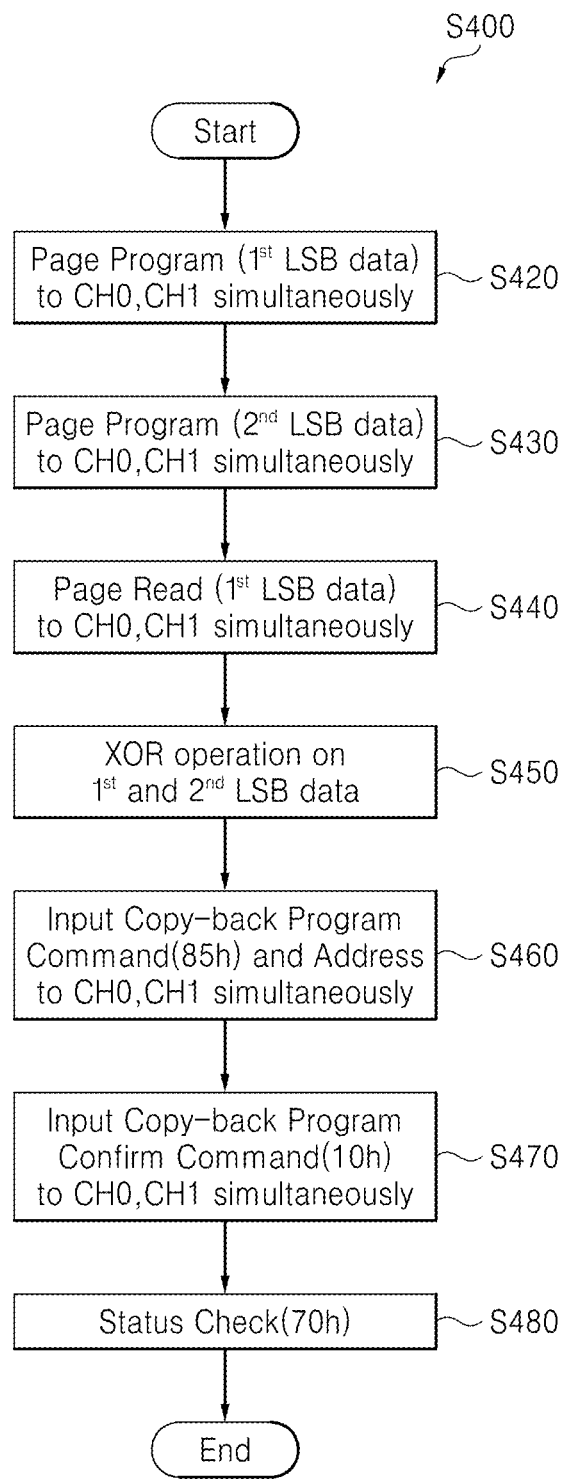
FIG. 16 is a flowchart illustrating a parity page pre-backup method, according to an example embodiment of the inventive concepts.
Figure 17A:
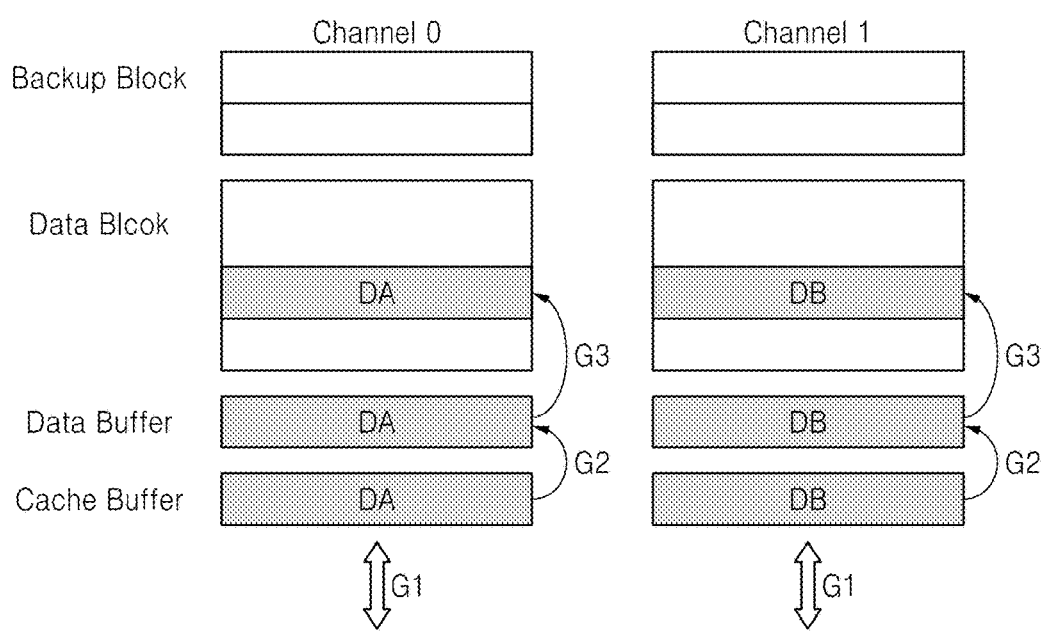
FIGS. 17A and 17B are diagrams illustrating the parity page pre-backup method, according to an example embodiment of the inventive concepts.
Figure 17B:
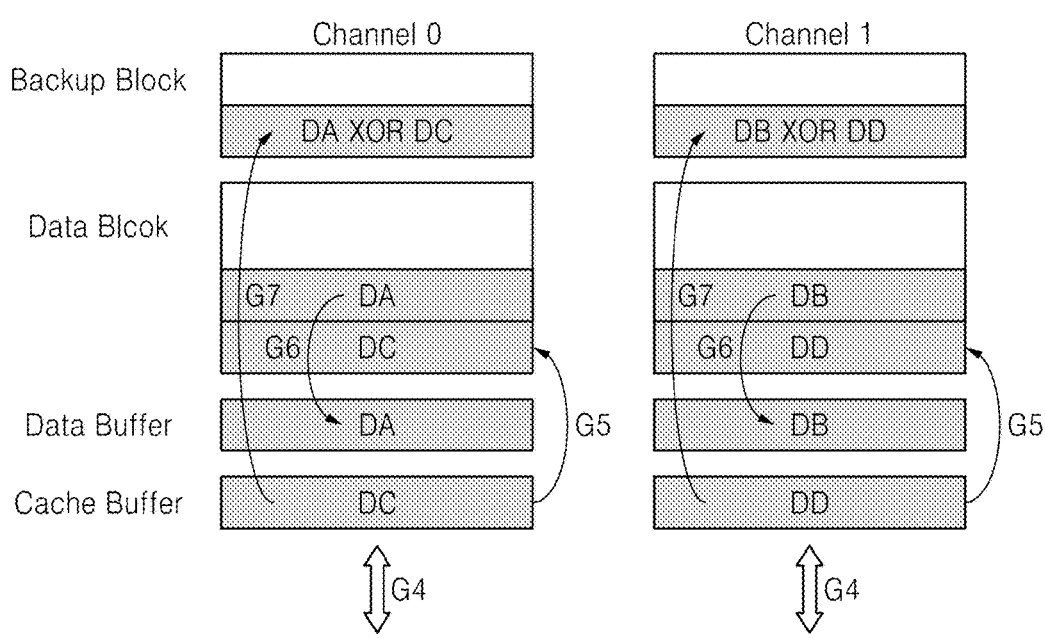

FIG. 16 is a flowchart illustrating a parity page pre-backup method, according to an example embodiment of the inventive concepts. FIGS. 17A and 17B are diagrams illustrating the parity page pre-backup method, according to an example embodiment of the inventive concepts.

Referring to FIGS. 16, 17A, and 17B, first LSB data DA and second LSB data DB belonging to a first group are programmed (S420).

Operation S420 may be similar to operations S320 to S350 of FIG. 13.

For example, a page program setup command (e.g., '80h') is commonly applied to a first channel Channel 0 and a second channel Channel 1, and a first channel address and a second channel address are simultaneously applied to the first and second channels Channel 0 and Channel 1, respectively. In this case, the first channel address is an address for designating a page of a data block to which the first LSB data DA is to be written, and the second channel address is an address for designating a page of a data block to which the second LSB data DB is to be written.

Then, the first and second LSB data DA and DB are simultaneously transmitted to page buffers of the respective first and second channels Channel 0 and Channel 1 via the first and second channels Channel 0 and Channel 1. The first and second LSB data DA and DB transmitted to the first and second channels Channel 0 and Channel 1 are different data and belong to the first group.

As illustrated in FIG. 17A, the first LSB data DA transmitted via the first channel Channel 0 is supplied to a cache buffer of the first channel Channel 0, and the second LSB data DB transmitted via the second channel Channel 1 is supplied to a cache buffer of the second channel Channel 1 (as indicated by an arrow G1).

Then, a page program confirm command (e.g., '10h') is simultaneously and commonly applied to the first and second channels Channel 0 and Channel 1. Then, as illustrated in FIG. 17A, non-volatile memory devices corresponding to the respective first and second channels Channel 0 and Channel 1 store the first and second LSB data DA and DB stored in the cache buffers in the data buffers of the first and second channels Channel 0 and Channel 1, respectively (as indicated by an arrow G2), and program the first and second LSB data DA and DB stored in the data buffers to pages corresponding to the first and second channel addresses (as indicated by an arrow G3).

For example, a memory device corresponding to the first channel Channel 0 programs LSB data DA stored in a first data buffer to a designated page of a designated data block (as indicated by an arrow G3), and a memory device corresponding to the second channel Channel 0 programs LSB data DB stored in a second data buffer to a designated page of a designated data block (as indicated by an arrow G3).

The programming of the LSB data DA and DB belonging to the first group is completed according to the process described above.

Referring back to FIG. 16, after the programming of the first and second LSB data DA and DB belonging to the first group is completed, third and fourth LSB data DC and DD belonging to a second group are programmed (S430). Operation S430 may be similar to S420.

That is, the programming of the third and fourth LSB data DC and DD is similar to the programming of the first and second LSB data DA and DB and is thus not redundantly described here.

After the programming of the third and fourth LSB data DC and DD, the first and second LSB data DA and DB are read out from the pages of the corresponding data blocks to corresponding data buffers, respectively (S440). To this end, a memory controller simultaneously and commonly applies a command (e.g., '00h') to the first and second channels Channel 0 and Channel 1, and simultaneously applies first and second channel addresses to the first and second channels Channel 0 and Channel 1. In this case, the first channel address is an address for designating a page of a data block to which the first LSB data DA is to be read out, and the second channel address is an address for designating a page of a data block to which the second LSB data DB is to be read out.

Then, an XOR operation is performed on the first LSB data DA read out to the corresponding data buffer and the third LSB data DC remaining in the corresponding cache buffer, and on the second LSB data DB read out to the corresponding data buffer and the fourth LSB data DD remaining in the corresponding cache buffer (S450). The data on which the XOR operation is performed (hereinafter referred to as 'XOR data') may be stored in the respective data buffers. An XOR circuit configured to perform the XOR operation on read data and data remaining in a page buffer may be included in the page buffer.

Then, in order to program the XOR data stored in the respective data buffers to backup blocks, the memory controller commonly applies a copy-back program command (e.g., '85h') to the first and second channels Channel 0 and Channel 1, and applies a fifth channel address and a sixth channel address via the first and second channels Channel 0 and Channel (S460).

The fifth channel address is an address for designating a page of a backup block to which the first XOR data (DA XOR DC) is to be backed up, and the sixth channel address is an address for designating a page of a backup block to which the second XOR data (DB XOR DD) is to be backed up.

The memory controller commonly applies a copy-back confirm command (e.g., '10h') via the first and second channels Channel 0 and Channel 1 (operation S470).

Then, as illustrated in FIG. 17B, non-volatile memory devices corresponding to the first and second channels Channel 0 and Channel 1 back up the XOR data stored in the respective data buffers by programming the XOR data to pages of the backup blocks corresponding to the fifth and sixth addresses (as indicated by an arrow G7).

Then, the memory controller may check whether programming of the XOR data to the respective memory devices is completed by applying a state check command (e.g., '70h') to the memory devices (S480).

As described above, in the parity page pre-backup method according to an example embodiment of the inventive concepts data that is to be programmed is divided into at least two groups and the at least two groups are sequentially programmed when the number of times of backing up is greater than a desired (or, alternatively predetermined) number of times, and is backed up by programming the data belonging to the at least two groups at once by performing the XOR operation thereon.

Figure 18:
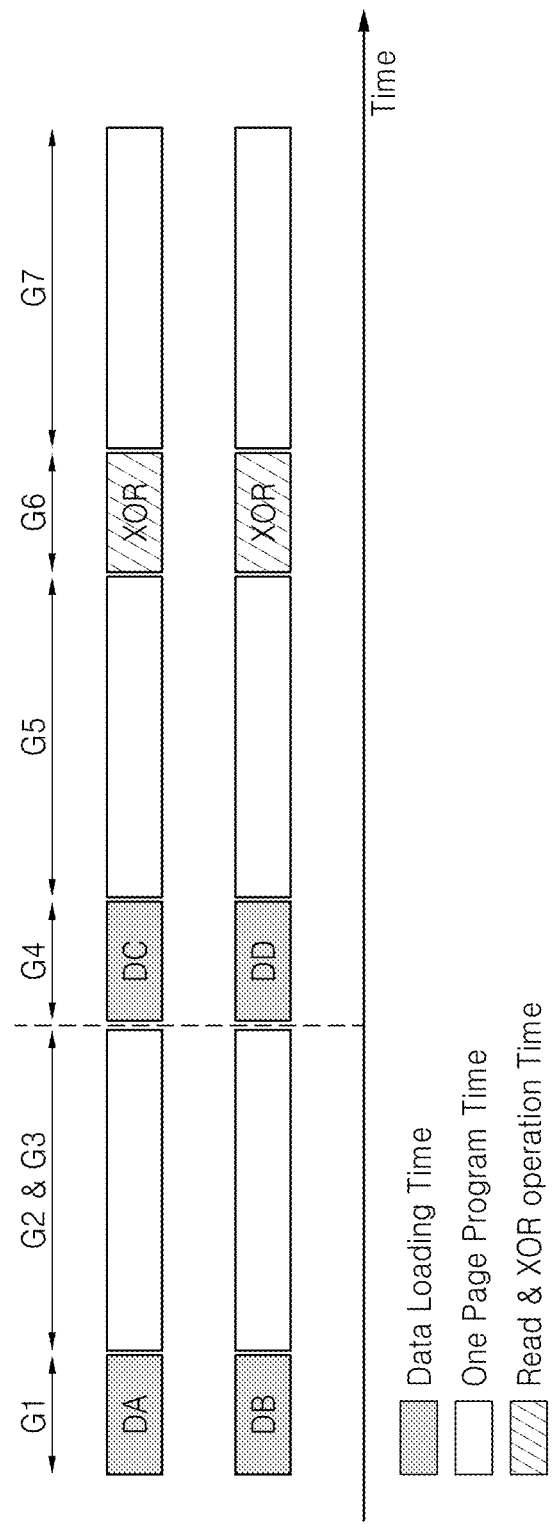
FIG. 18 is a schematic timing diagram illustrating the parity page pre-backup method, according to an example embodiment of the inventive concepts.

FIG. 18 is a schematic timing diagram illustrating the parity page pre-backup method, according to an example embodiment of the inventive concepts.

A pre-backup technique using parity data is applied when an LSB page should be backed up twice or more according to one write request. That is, this technique is useful to handle a request to write a very large amount of data. As illustrated in FIG. 18, in the parity page pre-backup method according to an example embodiment of the inventive concepts, LSB data DA and DB belonging to a first group are transmitted in parallel (as indicated by an arrow G1), and are programmed in parallel in memory devices (as indicated by an arrows G2 & G3).

After the programming of the LSB data DA and DB belonging to the first group is completed, LSB data DC and DD belonging to a second group are transmitted in parallel (as indicated by an arrow G4) and are programmed in parallel in the memory devices (as indicated by an arrow G5).

After the programming of the LSB data DC and DD belonging to the second group is completed, a logical operation is performed on the LSB data DA and DB belonging to the first group and the LSB data DC and DD belonging to the second group (as indicated by an arrow G6), and data obtained by performing the logical operation (referred to as 'parity data') is backed up by programming the parity data (as indicated by an arrow G7).

In the parity page pre-backup method according to an example embodiment of the inventive concepts a one-time write operation may be replaced with a one-time read operation, compared to a general backup method. In general, it takes about 600 us to perform a write operation and takes less than about 50 μs to perform a read operation, with respect to an LSB page.

As described above, according to the one or more example embodiments of the inventive concepts a backup type may be adaptively selected based on a backup data size. Thus, a substantial improvement is achieved in the performance that overcomes a write delay compared to a general backup technique.

Figure 19:
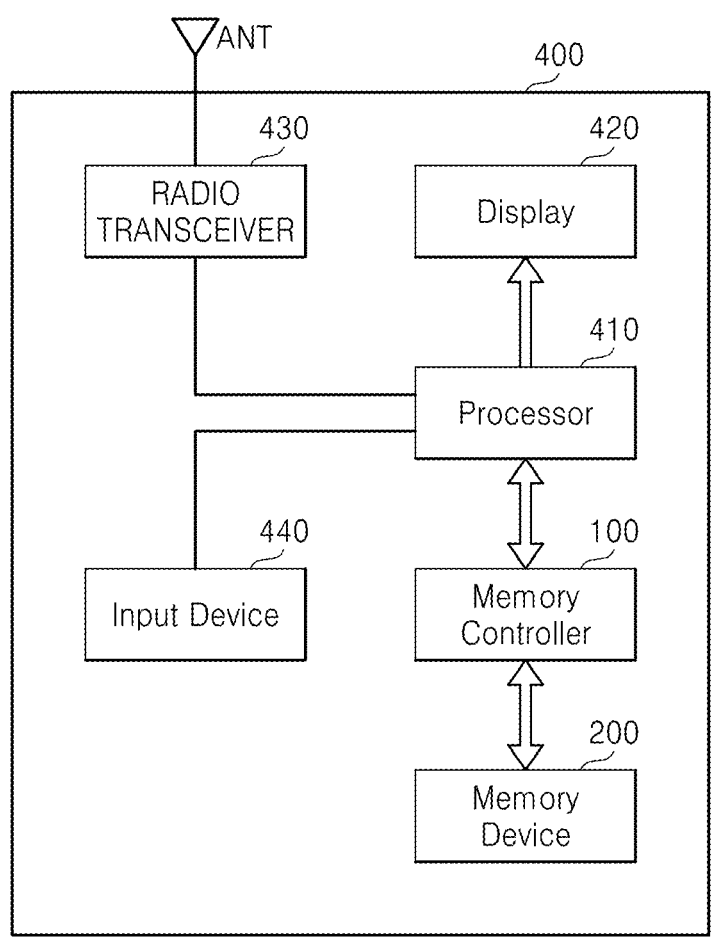
FIG. 19 is a block diagram of an electronic system including the non-volatile memory system, according to an example embodiment of the inventive concepts.

FIG. 19 is a block diagram of an electronic system including the non-volatile memory system according to example embodiments of the inventive concepts. Referring to FIG. 19, the electronic system 400 may be implemented as a cellular phone, a smart phone, a tablet personal computer (PC), a personal digital assistant (PDA) or a radio communication system.

The electronic system 400 includes the non-volatile memory device 200 and a memory controller 100 controlling the operations of the non-volatile memory device 200. The memory controller 100 may control the data access operations, e.g., a program operation, an erase operation, and a read operation, of the non-volatile memory device 200 according to the control of a processor 410.

The page data programmed in the non-volatile memory device 200 may be displayed through a display 420 according to the control of the processor 410 and/or the memory controller 100.

A radio transceiver 430 transmits or receives radio signals through an antenna ANT. The radio transceiver 430 may convert radio signals received through the antenna ANT into signals that may be processed by the processor 410. Accordingly, the processor 410 may process the signals output from the radio transceiver 430 and transmit the processed signals to the memory controller 100 or the display 420. The memory controller 100 may program the signals processed by the processor 410 to the non-volatile memory device 200. The radio transceiver 430 may also convert signals output from the processor 410 into radio signals and outputs the radio signals to an external device through the antenna ANT.

An input device 440 enables control signals for controlling the operation of the processor 410 or data to be processed by the processor 410 to be input to the electronic system 400. The input device 440 may be implemented by a pointing device such as a touch pad or a computer mouse, a keypad, or a keyboard.

The processor 410 may control the operation of the display 420 to display data output from the memory controller 100, data output from the radio transceiver 430, or data output from the input device 440. The memory controller 100, which controls the operations of the non-volatile memory device 200, may be implemented as a part of the processor 410 or as a separate chip.

Figure 20:
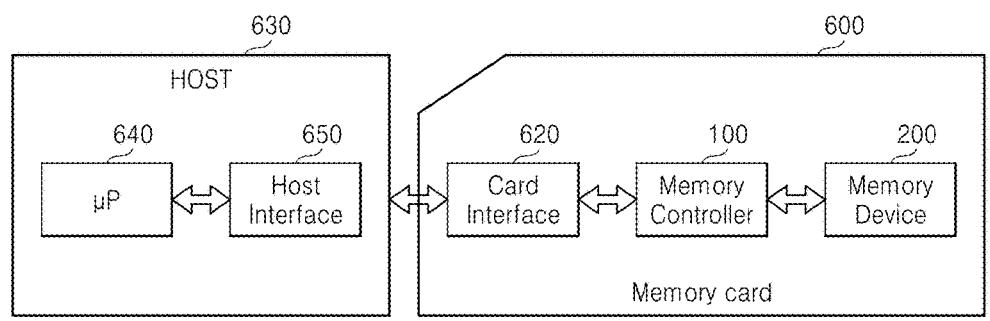
FIG. 20 is a block diagram of an electronic system including the non-volatile memory system, according to an example embodiment of the inventive concepts.

FIG. 20 is a block diagram of an electronic system including the non-volatile memory system according, to an example embodiment of the inventive concepts. The electronic system 600 may be implemented as a memory card or a smart card. The electronic system 600 includes the non-volatile memory device 200, a memory controller 100, and a card interface 620.

The memory controller 100 may control data exchange between the non-volatile memory device 200 and the card interface 620. The card interface 620 may be a secure digital (SD) card interface or a multi-media card (MMC) interface, but the inventive concepts is not restricted to the current embodiments.

The card interface 620 may interface a host 630 and the memory controller 100 for data exchange according to a protocol of the host 630. The card interface 620 may support a universal serial bus (USB) protocol and an interchip (IC)-USB protocol. Here, the card interface 620 may indicate a hardware supporting a protocol used by the host 630, a software installed in the hardware, or a signal transmission mode.

When the electronic system 600 is connected with a host interface 650 of the host 630 such as a PC, a tablet PC, a digital camera, a digital audio player, a cellular phone, a console video game hardware, or a digital set-top box, the host interface 650 may perform data communication with the non-volatile memory device 200 through the card interface 620 and the memory controller 100 according to the control of a microprocessor 640.

Figure 21:
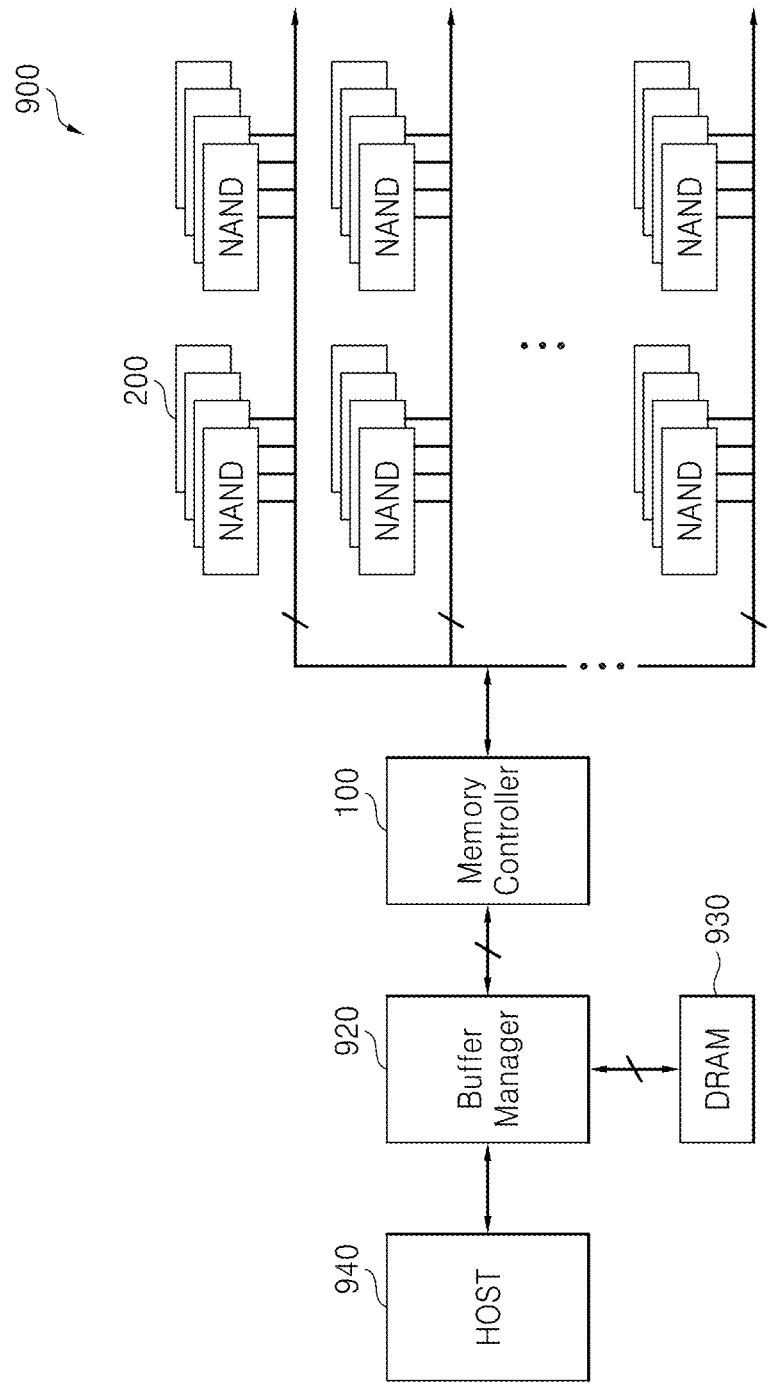
FIG. 21 is a block diagram of an electronic system including the non-volatile memory system, according to an example embodiment of the inventive concepts.

FIG. 21 is a block diagram of an electronic system including the non-volatile memory system, according to an example embodiment of the inventive concepts. The electronic system 900 may be implemented as a data storage system like a solid state drive (SSD).

The electronic system 900 includes a plurality of non-volatile memory devices 200, a memory controller 100 controlling the data processing operations of the non-volatile memory devices 200, a volatile memory device 930 like a dynamic random access memory (DRAM), and a buffer manager 920 controlling data transferred between the memory controller 100 and a host 940 to be stored in the volatile memory device 930.

Figure 22:
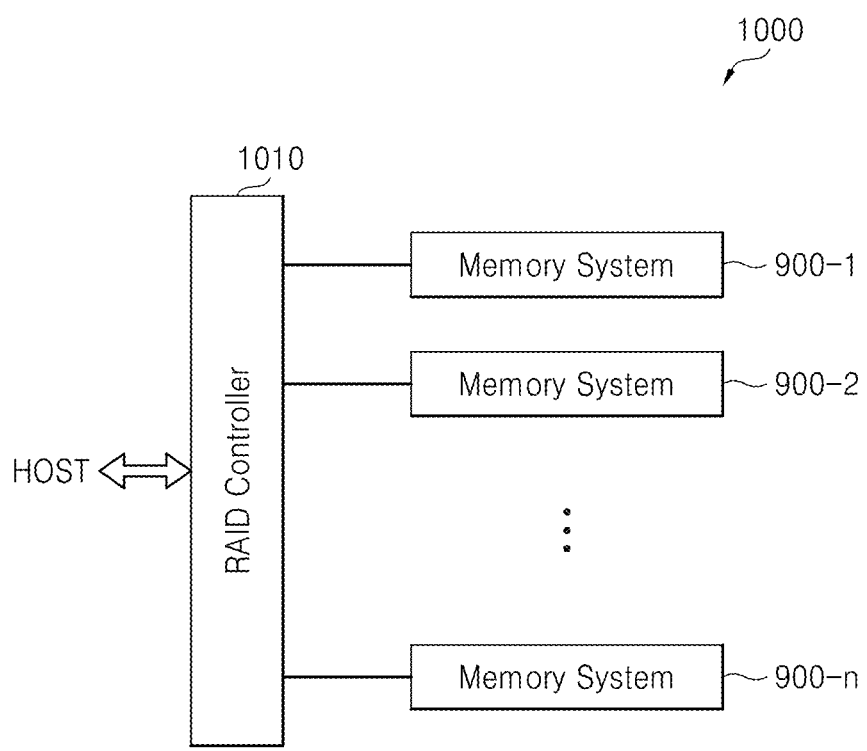
FIG. 22 is a block diagram of a data processing system including the non-volatile memory system, according to an example embodiment of the inventive concepts.

FIG. 22 is a block diagram of a data processing system including the non-volatile memory system, according to an example embodiment of the inventive concepts. The data processing system 1000 may be implemented as a redundant array of independent disks (RAID) system. The data processing system 1000 includes a RAID controller 1010 and a plurality of memory systems 900-1 through 900-n where "n" is a natural number.

Each of the memory systems 900-1 through 900-n may be the electronic system 900 illustrated in FIG. 21. The memory systems 900-1 through 900-n may form a RAID array. The data processing system 1000 may be a PC or an SSD.

During a program operation, the RAID controller 1010 may transmit program data output from a host to at least one of the memory systems 900-1 through 900-n according to a RAID level in response to a program command received from the host. During a read operation, the RAID controller 1010 may transmit to the host data read from at least one of the memory systems 900-1 through 900-n in response to a read command received from the host.

The present general inventive concepts may also be embodied as computer-readable codes on a computer-readable medium. The computer-readable recording medium is any data storage device that may store data as a program which may be thereafter read by a computer system. Examples of the computer-readable recording medium include read-only memory (ROM), random-access memory (RAM), CD-ROMs, magnetic tapes, floppy disks, and optical data storage devices.

The computer-readable recording medium may also be distributed over network coupled computer systems so that the computer-readable code is stored and executed in a distributed fashion. Also, functional programs, codes, and code segments to accomplish the present general inventive concepts may be easily construed by programmers.

According to the one or more embodiments of the inventive concepts a data backup type may be adaptively selected based on a write pattern such as a backup data size. Accordingly, a write overhead caused due to a data backup may be lowered to reduce degradation of a write performance due to the data backup.

While the inventive concepts has been particularly shown and described with reference to example embodiments thereof, it will be understood that various changes in form and details may be made therein without departing from the spirit and scope of the following claims.

What is claimed is:

1. An adaptive data backup method performed in a memory system including a non-volatile multi-level cell memory device, the method comprising:
receiving a write command from a host;
determining a backup data size, the backup data size being a size of data to be backed up among data requested to be written in the received write command;
selecting a backup type among at least two different backup types, based on the backup data size; and
backing up the data according to the selected backup type,
wherein if the backup data size is less than or equal to a first threshold, the selecting selects a first backup type, and
if the backup data size is greater than the first threshold, the selecting includes,
checking a number of times of backing up data pages; and
selecting one of a second backup type and a third backup type based on the number of times of backing up data pages.

2. The method of claim 1, wherein the first threshold is a number of pages corresponding to N/2, N being a number of channels connecting the non-volatile multi-level cell memory device to a controller, N being a natural number that is equal to or greater than 2, and
a plurality of memory devices are connected to each of the N channels, a number of the plurality of memory devices being equal to or greater than 2.

3. The method of claim 2, wherein, if the first backup type is selected, the backing up the data comprises:
simultaneously and commonly applying a page program setup command to a first channel and a second channel;
simultaneously applying a first channel address and a second channel address to the first channel and the second channel, respectively;
simultaneously transmitting least significant bit (LSB) data requested to be written, to the first channel and the second channel; and
simultaneously and commonly applying a page program confirm command to the first channel and the second channel, wherein
the first channel address is an address for designating a page of a data block to which the LSB data is to be written by a first memory device connected to the first channel, and
the second channel address is an address for designating a page of a backup block to which the LSB data is to be backed up by a second memory device connected to the second channel.

4. The method of claim 3, wherein the backing up the data further comprises:
storing the LSB data transmitted via the first channel in a page buffer of the first memory device;
storing the LSB data transmitted via the second channel in a page buffer of the second memory device;
programming the LSB data stored in the page buffer of the first memory device to a page of the data block corresponding to the first channel address by the first memory device according to the page program confirm command; and
programming the LSB data stored in the page buffer of the second memory device to a page of the backup block corresponding to the second channel address by the second memory device according to the page program confirm command,
wherein the programming of the LSB data to the page of the data block and the programming of the LSB data to the page of the backup block are performed in parallel.

5. The method of claim 1, wherein the selecting one of the second backup type and the third backup type comprises:
selecting the second backup type when the number of times of backing up data pages is less than or equal to a second threshold; and
selecting the third backup type when the number of times of backing up data pages is greater than the second threshold.

6. The method of claim 5, wherein, if the second backup type is selected, the backing up the data comprises:
simultaneously and commonly applying a page program setup command to a first channel and a second channel, the first channel and the second channel connecting the non-volatile multi-level memory cell device to a NAND flash controller;
simultaneously applying a first channel address and a second channel address to the first channel and the second channel, respectively, wherein the first channel address is an address for designating a page of a data block to which first least significant bit (LSB) data is to be written by a first memory device connected to the first channel, and the second channel address is an address for designating a page of a data block to which second LSB data is to be written by a second memory device connected to the second channel, the first memory device and the second memory device being connected to the first channel and the second channel, respectively;
simultaneously transmitting the first LSB data which is a part of LSB data requested to be written and the second LSB data which is another part of the LSB data to the first channel and the second channel, respectively;
simultaneously and commonly applying a page program confirm command to the first channel and the second channel;
commonly applying a state check command to the first channel and the second channel;
checking whether programming of the first LSB data by the first memory device and programming of the second LSB data by the second memory device are completed according to the state check command, and commonly applying a copy-back program command to the first and second channels;
simultaneously applying a third channel address and a fourth channel address to the first channel and the second channel, respectively, wherein the third channel address is an address for designating a page of a backup block to which the first LSB data is to be backed up by the first memory device, and the fourth channel address is an address for designating a page of a backup block to which the second LSB data is to be backed up by the second memory device; and
simultaneously applying a copy-back program confirm command to the first channel and the second channel.

7. The method of claim 6, wherein the backing up the data further comprises:
storing the first LSB data transmitted via the first channel to a page buffer of the first memory device;
storing the second LSB data transmitted via the second channel to a page buffer of the second memory device;
programming the first LSB data stored in the page buffer of the first memory device to a page of a data block corresponding to the first channel address by the first memory device according to the page program confirm command;
programming the second LSB data stored in the page buffer of the second memory device to a page of a data block corresponding to the second channel address by the second memory device according to the page program confirm command;
programming the first LSB data remaining in the page buffer of the first memory device to a page of a backup block corresponding to the third channel address by the first memory device according to the copy-back program confirm command; and programming the second LSB data remaining in the page buffer of the second memory device to a page of a backup block corresponding to the fourth channel address by the second memory device according to the copy-back program confirm command wherein
the programming the first LSB data stored in the page buffer of the first memory device and the programming the second LSB data stored in the page buffer of the second memory device are performed in parallel, and
the programming the first LSB data remaining in the page buffer of the first memory device and the programming the second LSB data remaining in the page buffer of the second memory device are performed in parallel.

8. The method of claim 5, wherein if the third backup type is selected, the backing up the data comprises:
transmitting LSB data belonging to a first group via a first channel and a second channel, the first channel and the second channel connecting the non-volatile multi-level memory cell device to a NAND flash controller;
programming the LSB data belonging to the first group to memory devices of the first channel and the second channel;
upon the programming the LSB data belonging to the first group being completed, transmitting LSB data belonging to a second group via the first channel and the second channel;
programming the LSB data belonging to the second group to the memory devices of the first channel and the second channel;
generating parity data by performing a logical operation on the LSB data belonging to the first group and the LSB data belonging to the second group; and
backing up the parity data to the memory devices of the first and second channels.

9. The method of claim 8, wherein before performing the generating parity data, the backing up the data according to the selected backup type further comprises:
reading out the LSB data belonging to the first group to a page buffer,
wherein the parity data is generated by performing an XOR operation on the LSB data belonging to the first group and the LSB data belonging to the second group in the page buffer.

10. A memory system comprising:
a memory controller; and
a non-volatile multi-level cell memory device including a plurality of memory devices connected to the memory controller via N channels, wherein N denotes a natural number that is equal to or greater than 2, wherein the memory controller is configured to,
receive a write command from a host, determines a backup data size, the backup data size being a size of data to be backed up among data requested to be written in the received write command,
select a backup type among at least two different backup types, based on the backup data size, and
control the non-volatile memory cell device to back up the data according to the selected backup type,
wherein if the backup data size is less than or equal to a first threshold, the first threshold being a number of pages corresponding to N/2, the memory controller is configured to select an interleaving pre-backup as a first backup type,
if the backup data size is greater than the first threshold, the memory controller is configured to,
checks a number of times of backing up data pages, and selects one of a copy-back pre-backup as a second backup type and a parity page pre-backup as a third backup type based on the checked number of times of backing up data pages.

11. The memory system of claim 10, wherein if the memory controller selects the first backup type, the memory controller is configured to, commonly apply least significant bit (LSB) data to a first channel and a second channel, and commonly apply a program command to the first channel and the second channel, and at least one memory device connected to the second channel programs the LSB data to a page of a backup block according to the program command while at least one memory device connected to the first channel programs the LSB data to a page of a data block according to the program command.

12. The memory system of claim 10, wherein if the memory controller selects the second backup type, the memory controller is configured to, simultaneously apply first least significant bit (LSB) data and second LSB data in parallel to a first channel and a second channel, respectively, and commonly apply a program command to the first channel and the second channel, at least one memory device connected to the second channel programs the second LSB data to a page of a data block according to the program command while at least one memory device connected to the first channel programs the first LSB data to a page of a data block according to the program command, when the programming of the first LSB data and the second LSB data is completed, the memory controller commonly applies a copy-back program command to the first channel and the second channel, and the at least one memory device connected to the second channel backs up the second LSB data remaining in a page buffer thereof to a page of a backup block according to the copy-back program command while the at least one memory device connected to the first channel backs up the first LSB data remaining in a page buffer thereof to a page of a backup block according to the copy-back program command.

13. The memory system of claim 10, wherein if the memory controller selects the third backup type, the memory controller is configured to, transmit LSB data belonging to a first group via a first channel and a second channel to program the LSB data to memory devices of the first channel and the second channel, transmit LSB data belonging to a second group via the first channel and the second channel to program the LSB data belonging to the second group to the memory devices of the first channel and the second channel after the programming of the LSB data belonging to the first group is completed, and back up data obtained by performing a logical operation on the LSB data belonging to the first group and the LSB data belonging to the second group to the memory devices of the first channel and the second channel after the programming of the LSB data belonging to the second group is completed.

14. A data backup method, comprising:

receiving a write command for writing data to a non-volatile memory device;

determining a backup type from among a plurality of backup types based on a size of the data; and backing up the data based on the determined backup type, wherein the determining includes, selecting a first backup type if the size of the data is less than or equal to a first threshold, the first threshold being a number of pages corresponding to N/2, N being a number of channels connecting a memory controller to the non-volatile memory device, the non-volatile memory device having at least one memory device, each of the at least one memory device being connected to one of the N channels, and determining one of a second backup type and a third backup type if the size of the data is greater than the first threshold.

15. The method of claim 14, wherein the determining one of a second backup type and a third backup type comprises:

determining a number of times of backing up data pages, and selecting one of the second backup type and the third backup type based on the determined number of times of backing up data pages.

* * * * *